US012641224B2

(12) United States Patent
Zhang et al.

(10) Patent No.: US 12,641,224 B2
(45) Date of Patent: May 26, 2026

(54) INTRA-PREDICTION ON NON-DYADIC BLOCKS

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Zhipin Deng, Beijing (CN); Na Zhang, Beijing (CN); Yang Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 212 days.

(21) Appl. No.: 18/475,776

(22) Filed: Sep. 27, 2023

(65) Prior Publication Data

US 2024/0031565 A1 Jan. 25, 2024

Related U.S. Application Data

(63) Continuation of application No. PCT/CN2022/083595, filed on Mar. 29, 2022.

(30) Foreign Application Priority Data

Mar. 30, 2021 (WO) ................ PCT/CN2021/083904

(51) Int. Cl.
H04N 19/11 (2014.01)
H04N 19/119 (2014.01)
(Continued)

(52) U.S. Cl.
CPC ........... *H04N 19/11* (2014.11); *H04N 19/119* (2014.11); *H04N 19/159* (2014.11);
(Continued)

(58) Field of Classification Search
None
See application file for complete search history.

(56) References Cited

U.S. PATENT DOCUMENTS

2018/0109812 A1 4/2018 Tsai
2018/0199072 A1 7/2018 Li
(Continued)

FOREIGN PATENT DOCUMENTS

WO 2019222042 A1 11/2019
WO 2020008714 A1 1/2020

OTHER PUBLICATIONS

Sullivan, G., et al., "Overview of the High Efficiency Video Coding (HEVC) Standard," IEEE Transactions On Circuits And Systems For Video Technology, vol. 22, No. 12, Dec. 2012, 20 pages.
(Continued)

*Primary Examiner* — Chikaodili E Anyikire
(74) *Attorney, Agent, or Firm* — Conley Rose, P.C.

(57) ABSTRACT

A mechanism for processing video data implemented by a video coding apparatus is disclosed. The mechanism determines whether a block is dyadic or non-dyadic. The mechanism also enables a coding tool associated with intra prediction when the block is determined to be dyadic. The mechanism also disables the coding tool when the block is determined to be non-dyadic. A conversion between a visual media data and a bitstream is performed by applying intra prediction to the block.

19 Claims, 17 Drawing Sheets

2100

2102 — Determining whether a block is dyadic or non-dyadic.

2104 — Enabling a coding tool when the block is determined to be dyadic, wherein the coding tool is associated with intra prediction.

2106 — Disabling the coding tool used in intra prediction when the block is a determined to be non-dyadic block.

2108 — Performing a conversion between a visual media data and a bitstream by applying intra prediction to the block in accordance with whether the coding tool has been enabled or disabled.

(51) Int. Cl.
      *H04N 19/159*        (2014.01)
      *H04N 19/176*        (2014.01)
      *H04N 19/593*        (2014.01)
      *H04N 19/70*         (2014.01)
(52) U.S. Cl.
      CPC ......... *H04N 19/176* (2014.11); *H04N 19/593*
                      (2014.11); *H04N 19/70* (2014.11)

(56)                References Cited

U.S. PATENT DOCUMENTS

| | | | |
|---|---|---|---|
| 2019/0335172 A1 | 10/2019 | Zhao | |
| 2024/0073428 A1* | 2/2024 | Rath | .................... H04N 19/593 |
| 2024/0163443 A1* | 5/2024 | Le Léannec | ........... H04N 19/59 |

OTHER PUBLICATIONS

Luthra, A., "Overview of the H.264/AVC video coding standard," Proceedings of SPIE vol. 5203 Applications of Digital Image Processing XXVI, Nov. 19, 2003, 16 pages.
Document: JVET-G1001-v1, Chen, J., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
JEM-7.0: https://jvet.hhi.fraunhofer.de/svn/svn_HMJEMSoftware/tags/ HM-16.6-JEM-7.0, Dec. 22, 2023, 1 page.
"Series H: Audiovisual and Multimedia Systems Infrastructure of audiovisual services—Coding of moving video High efficiency video coding," Recommendation ITU-T H.265, Aug. 2021, 716 pages.
Document: JVET-D0117r1, Li, X., et al., "Multi-Type-Tree," Joint Video Exploration Team (JVET) of ITU-T SG 16 WP 3 and ISO/IEC JTC 1/SC 29/WG 11 4th Meeting: Chengdu, CN, Oct. 15-21, 2016, 3 pages.
Document: JVET-M0102-v5, De-Luxan-Hernandez, S., et al., "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, 9 pages.
Document: JVET-J1001-v2, Bross, B., "Versatile Video Coding (Draft 1)," Joint Video Experts Team (JVET) of ITU-T SG 16 WP 3 and ISO/IEC JTC 1/SC 29/WG 11 10th Meeting: San Diego, US, Apr. 10-20, 2018, 43 pages.
Budagavi, M., et al., "Core Transform Design for the High Efficiency Video Coding (HEVC) Standard," IEEE Journal of Selected Topics in Signal Processing, vol. 7, No. 6, pp. 1029-1041, Dec. 2013, 13 pages.
Document: JVET-N0217, Pfaff, J., et al., "CE3: Affine linear weighted intra prediction (CE3-4.1, CE3-4.2)," Joint Video Experts Team (JVET) of ITU-T SG 16 WP 3 and ISO/IEC JTC 1/SC 29/WG 11 14th Meeting: Geneva, CH, Mar. 19-27, 2019, 17 pages.
Document: JVET-M0413, Said, A., et al., "CE5: Per-context CABAC initialization with single window (Test 5.1.4)," Joint Video Experts Team (JVET) of ITU-T SG 16 WP 3 and ISO/IEC JTC 1/SC 29/WG 11 13th Meeting: Marrakech, MA, Jan. 9-18, 2019, 3 pages.
Document: JVET-P0599-v2, Filippov, A., et al., "Non-CE3: Cleanup of interpolation filtering for intra prediction," Joint Video Experts Team (JVET) of ITU-T SG 16 WP 3 and ISO/IEC JTC 1/SC 29/WG 11 16th Meeting: Geneva, CH, Oct. 1-11, 2019, 8 pages.
International Search Report from PCT Application No. PCT/CN2022/083595 dated Jun. 21, 2022, 10 pages.

* cited by examiner

200

Macroblock Partitions

300

CB Partitions

MxM          M/2 x M          MxM/2          M/2xM/2

M/4 x M (L)     M/4 x M (R)     M x M/4 (U)     M x M/4 (D)

400

Macroblock Partitions

401

403

500

QTBT Partitions

501

503

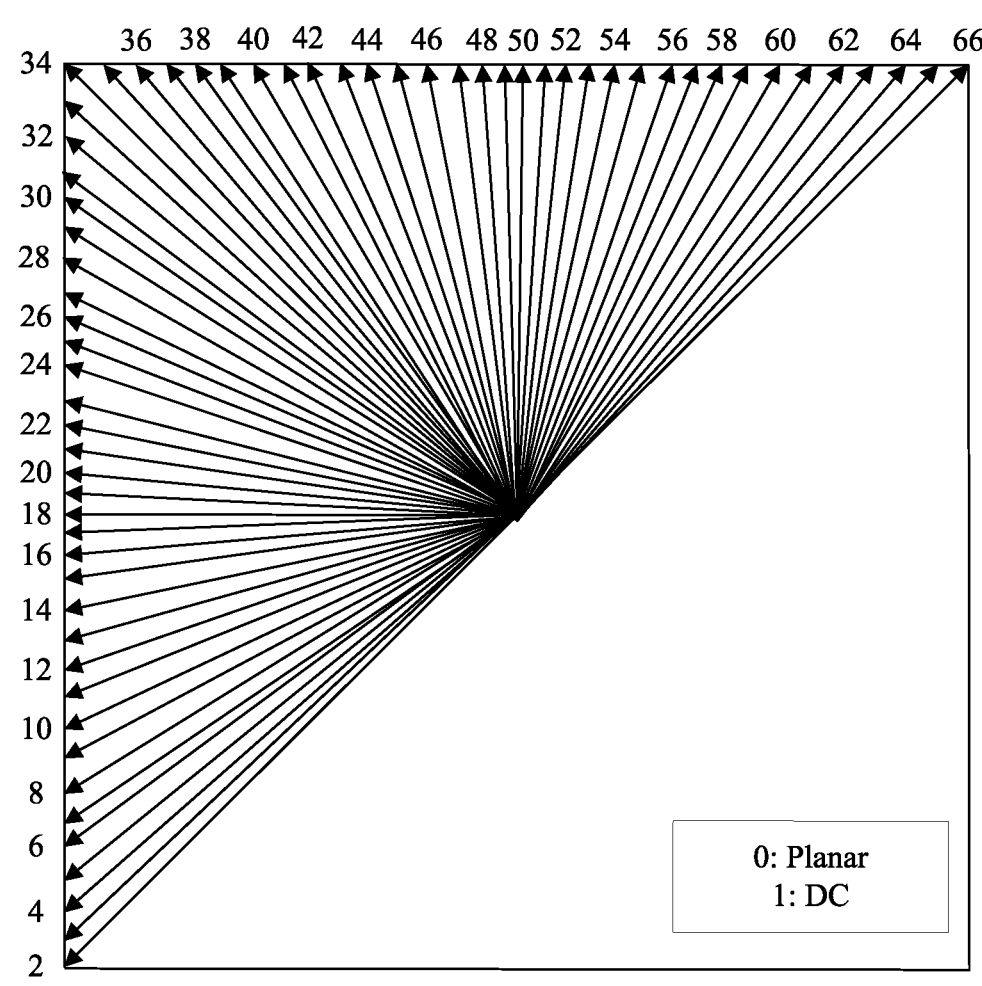
FIG. 9

Segment D  Segment E  Segment F

1000

Reference line 3
Reference line 2
Reference line 1
Reference line 0

Segment C

Block Unit

Segment B

Segment A

1100

W

H

Horizontal

W

H/2

W

Vertical

H

W/2

1200

1300

1400

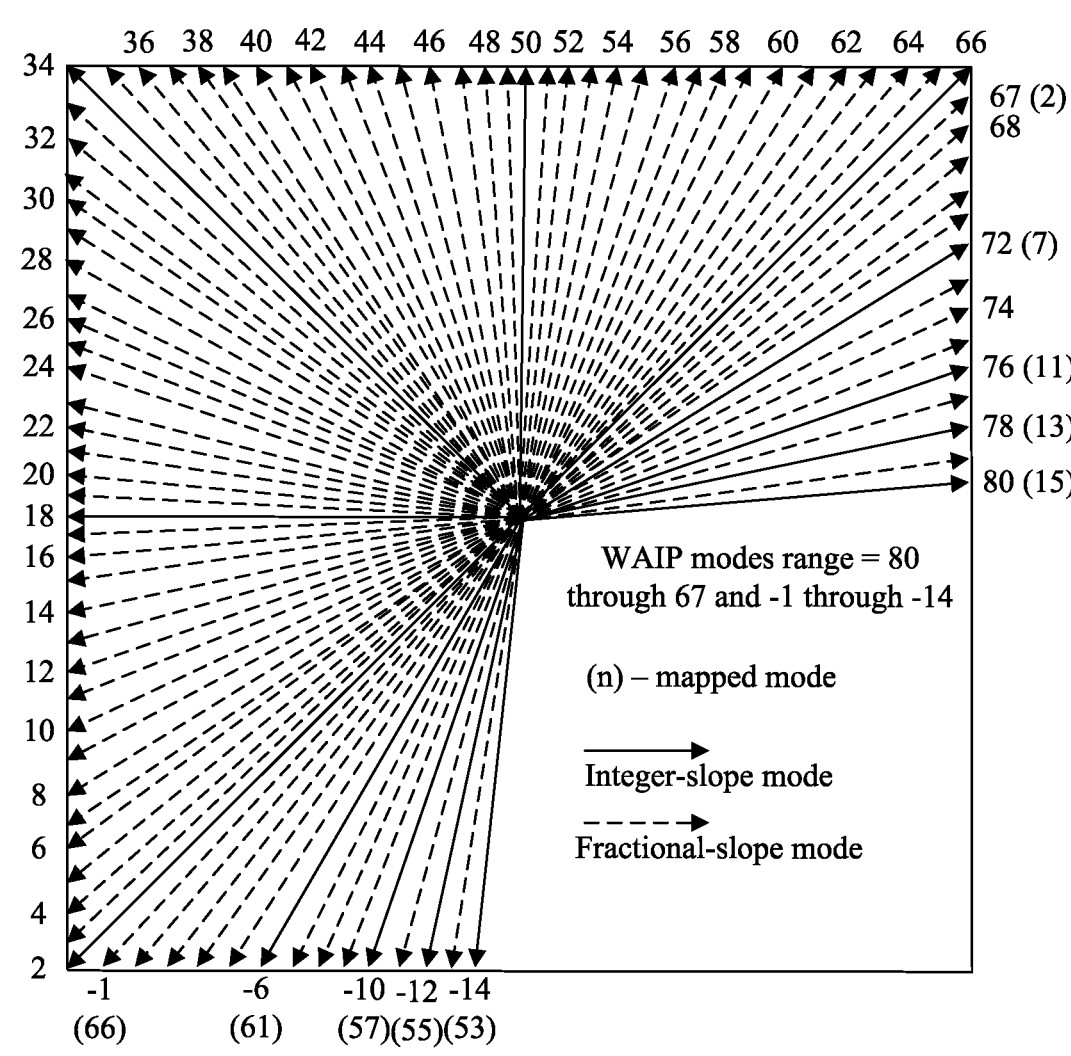
FIG. 17

1900

1902

1904 1906 1908

1910

2000

2002

Processor

2004

Memory

Video Processing
Circuitry

2006

2100

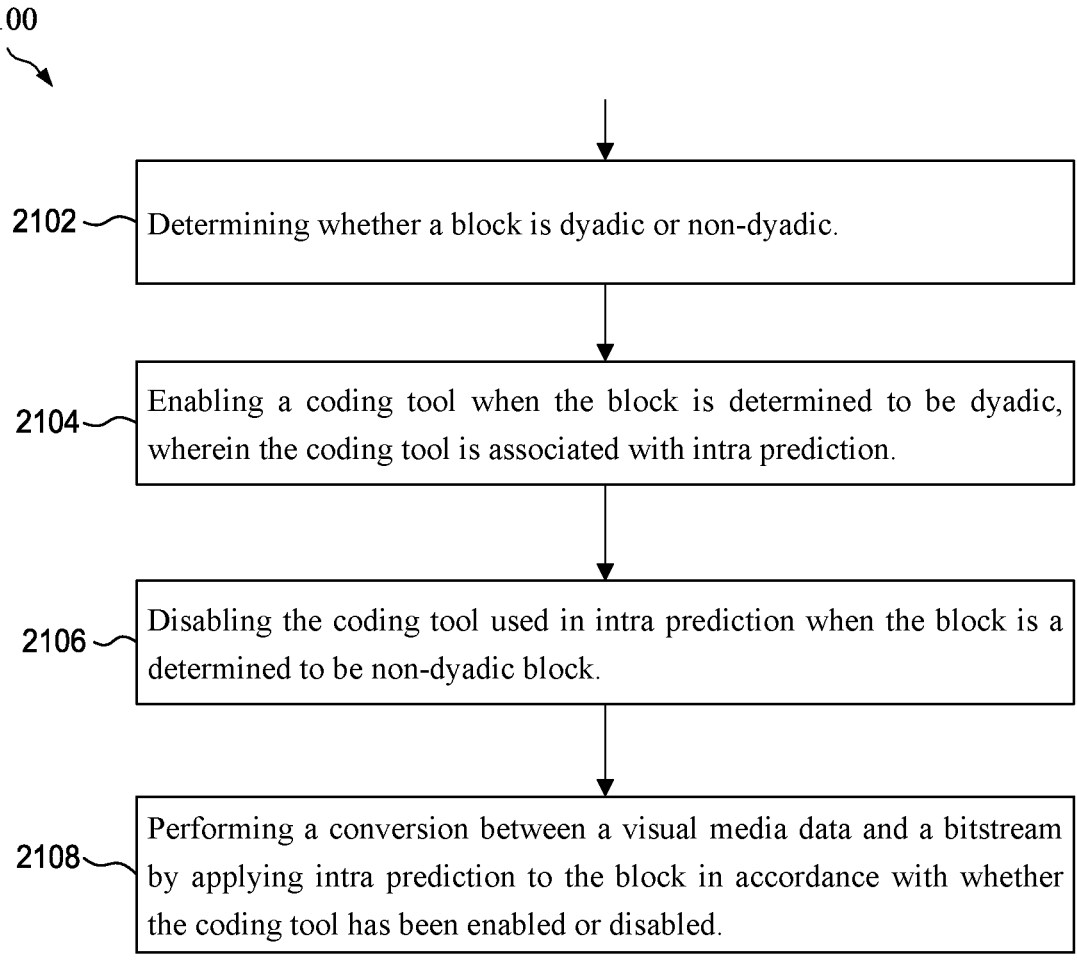

2102 — Determining whether a block is dyadic or non-dyadic.

2104 — Enabling a coding tool when the block is determined to be dyadic, wherein the coding tool is associated with intra prediction.

2106 — Disabling the coding tool used in intra prediction when the block is a determined to be non-dyadic block.

2108 — Performing a conversion between a visual media data and a bitstream by applying intra prediction to the block in accordance with whether the coding tool has been enabled or disabled.

FIG. 21

INTRA-PREDICTION ON NON-DYADIC BLOCKS

CROSS-REFERENCE TO RELATED APPLICATIONS

This patent application is a continuation of International Patent Application No. PCT/CN2022/083595 filed on Mar. 29, 2022, which claims the priority to and benefits of International Application No. PCT/CN2021/083904 filed Mar. 30, 2021. All the aforementioned patent applications are hereby incorporated by reference in their entireties.

TECHNICAL FIELD

This patent document relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data implemented by a video coding apparatus, comprising: determining whether a block is dyadic or non-dyadic; enabling a coding tool associated with intra prediction when the block is determined to be dyadic; disabling the coding tool when the block is determined to be non-dyadic; and performing a conversion between a visual media data and a bitstream by applying intra prediction to the block.

Optionally, in any of the preceding aspects, another implementation of the aspect provides that the coding tool is multiple reference line (MRL), matrix based intra prediction (MIP), intra sub-partitions (ISP), cross-component linear model (CCLM), CCLM left (LML), CCLM above, (LMA), position dependent intra prediction combination (PDPC), decode-side mode derivation (DIMD), or combinations thereof.

Optionally, in any of the preceding aspects, another implementation of the aspect provides that a syntax element associated with the coding tool is included in the bitstream when the block is determined to be dyadic, and wherein the syntax element associated with the coding tool is not included in the bitstream when the block is determined to be non-dyadic.

Optionally, in any of the preceding aspects, another implementation of the aspect provides that the block has a width (W) and a height (H), wherein the block is coded according to a direct current (DC) prediction value determined based on a reduced width (W1) or a reduced height (H1) when the block is determined to be non-dyadic, where W1 is less than W and H1 is less than H.

Optionally, in any of the preceding aspects, another implementation of the aspect provides that the block is coded according to a DC prediction value determined based on a dyadic number of spatially consecutive neighboring samples when the block is determined to be non-dyadic, and wherein the block has a non-dyadic number of neighboring samples and the dyadic number of spatially consecutive neighboring samples is less than the non-dyadic number of neighboring samples.

Optionally, in any of the preceding aspects, another implementation of the aspect provides that a first of the spatially consecutive neighboring samples is positioned at a top left corner of the block.

Optionally, in any of the preceding aspects, another implementation of the aspect provides that a first of the spatially consecutive neighboring samples is not positioned at a top left corner of the block.

Optionally, in any of the preceding aspects, another implementation of the aspect provides that the block is coded according to a DC prediction value determined based on a dyadic number of spatially non-consecutive neighboring samples when the block is determined to be non-dyadic.

Optionally, in any of the preceding aspects, another implementation of the aspect provides that the block has a height (H) and a width (W), wherein the block is coded according to the following when the block is determined to be non-dyadic:

$$D = \frac{P + Q + \text{offset}}{N},$$

$$P = \sum_{k=0}^{W'-1} S(k + xCurr, yCurr - RefLy),$$

$$Q = \sum_{k=0}^{H'-1} S(xCurr - RefLx, yCurr + k),$$

and $N = W' + H'$ where D a DC prediction value, offset is an integer value, S indicates a sample value at a corresponding location, k is a sample index, xCurr is a horizontal coordinate of a top left sample of the block, yCurr is a vertical coordinate of a top left sample of the block, RefLy indicates a reference line row, RefLx indicates a reference line column, W' is a width associated with the block, and H' is a height associated with the block, wherein H' is a dyadic height smaller than H or W' is a dyadic width smaller than W.

Optionally, in any of the preceding aspects, another implementation of the aspect provides that the block is coded according to a DC prediction value determined based on a dyadic number of neighbor samples selected according to a step size function when the block is determined to be non-dyadic.

Optionally, in any of the preceding aspects, another implementation of the aspect provides that the block is coded according to a DC prediction value determined based on a dyadic number of above neighboring samples and a dyadic number of left neighboring samples when the block is determined to be non-dyadic.

Optionally, in any of the preceding aspects, another implementation of the aspect provides that the bitstream includes a codeword indicating a wide angle intra prediction used to code the block, wherein the codeword indicates a signaled wide angle intra prediction (sigpredMode) when the block is dyadic, and wherein the codeword indicates a final wide angle intra prediction (finalpredMode) when the block is non-dyadic.

Optionally, in any of the preceding aspects, another implementation of the aspect provides that the finalpred-Mode is a function of sigpredMode, a width (W) of the block, and a height (H) of the block.

Optionally, in any of the preceding aspects, another implementation of the aspect provides that the finalpred-Mode is equal to sigpredMode plus an integer value when W is greater than H and sigpredMode is less than a threshold mode (ThresMode).

Optionally, in any of the preceding aspects, another implementation of the aspect provides that the finalpred-Mode is equal to sigpredMode plus an integer value when W is less than H and sigpredMode is greater than a threshold mode (ThresMode).

Optionally, in any of the preceding aspects, another implementation of the aspect provides that the ThresMode is an angle equal to $$\underset{\alpha}{\mathrm{argmin}}\{\tan\alpha \geq H/W\},$$

an angle equal to $$\underset{\alpha}{\mathrm{argmax}}\{\tan\alpha \leq H/W\},$$

a function of a mode difference (modeDiff), a function of $\lfloor\log_2 W\rfloor$ and $\lfloor\log_2 H\rfloor$, a function of $\lceil\log_2 W\rceil$ and $\lceil\log_2 H\rceil$, or combinations thereof.

Optionally, in any of the preceding aspects, another implementation of the aspect provides that the block is coded according to ISP, and wherein when the block is non-dyadic, the block is divided into an odd number of sub-partitions, divided into more than four sub-partitions, divided into sub-partitions with different dimensions along a non-dyadic direction, divided into a number of sub-partitions that is a multiple of a predetermine integer value, or combinations thereof.

Optionally, in any of the preceding aspects, another implementation of the aspect provides that when the block is non-dyadic, the block is coded according to MIP by dividing the non-dyadic block into a plurality of dyadic sub-blocks prior to application of a matrix.

Optionally, in any of the preceding aspects, another implementation of the aspect provides that the block is coded according to substitution of unavailable neighboring samples by obtaining a dyadic number of left neighboring samples when a height (H) of the block is non-dyadic and obtaining a dyadic number of above neighboring samples when a width (W) of the block is non-dyadic.

Optionally, in any of the preceding aspects, another implementation of the aspect provides that when the block is non-dyadic, the block is coded according to CCLM by obtaining a dyadic number of left neighboring samples when a height (H) of the block is non-dyadic and obtaining a dyadic number of above neighboring samples when a width (W) of the block is non-dyadic.

Optionally, in any of the preceding aspects, another implementation of the aspect provides that the block is coded according to a planar intra prediction mode value determined according to a division operation with a divisor based on a width (W) of the block and a height (H) of the block when the block is determined to be non-dyadic.

Optionally, in any of the preceding aspects, another implementation of the aspect provides that when the block is determined to be non-dyadic, the block is coded according to prediction sample values at a positions (x, y) (predSamples[x][y]) derived according to:

$$predV[x][y]=((H{-}1{-}y)*p[x][{-}1]{+}(y{+}1)*p[{-}1][H])*W,$$

$$predH[x][y]=((W{-}1{-}x)*p[{-}1][y]{+}(x{+}1)*p[W][{-}1])*H,$$
and $$predSamples[x][y]=(predV[x][y]{+}predH[x][y]{+}W*H)/(W*H*2),$$

where H is a height of the block, W is a width of the block, (x, y) are sample coordinates, and p[ ][ ] indicates neighboring samples at a corresponding coordinate.

Optionally, in any of the preceding aspects, another implementation of the aspect provides that when the block is determined to be non-dyadic, the block is coded according to prediction sample values at a positions (x, y) (predSamples[x][y]) derived according to:

$$predV[x][y]=((H{-}1{-}y)*p[x][{-}1]{+}(y{+}1)*p[{-}1][H]{+}H/2)/H,$$

$$predH[x][y]=((W{-}1{-}x)*p[{-}1][y]{+}(x{+}1)*p[W][{-}1]{+}W/2)/W, \text{ and}$$

$$predSamples[x][y]=(predV[x][y]{+}predH[x][y]{+}1){>}{>}1,$$

where H is a height of the block, W is a width of the block, (x, y) are sample coordinates, >> is a right shift operator, and p[ ][ ] indicates neighboring samples at a corresponding coordinate.

Optionally, in any of the preceding aspects, another implementation of the aspect provides that when the block is determined to be non-dyadic, the block is coded according to prediction sample values at a positions (x, y) (predSamples[x][y]) derived according to:

$$predV[x][y]=((H{-}1{-}y)*p[x][{-}1]{+}(y{+}1)*p[{-}1][H]{+}H/2)/H,$$

$$predH[x][y]=((W{-}1{-}x)*p[{-}1][y]{+}(x{+}1)*p[W][{-}1]{+}W/2){>}{>}\log 2(W), \text{ and}$$

$$predSamples[x][y](predV[x][y]{+}predH[x][y]{+}1){>}{>}1,$$

where H is a height of the block, W is a width of the block, (x, y) are sample coordinates, >> is a right shift operator, log 2 is a logarithmic function, and p[ ][ ] indicates neighboring samples at a corresponding coordinate.

Optionally, in any of the preceding aspects, another implementation of the aspect provides that when the block is determined to be non-dyadic, the block is coded according to prediction sample values at a positions (x, y) (predSamples[x][y]) derived according to:

$$predV[x][y]=((H{-}1{-}y)*p[x][{-}1]{+}(y{+}1)*p[{-}1][H]{+}H/2){>}{>}\log 2(H),$$

$$predH[x][y]=((W{-}1{-}x)*p[{-}1][y]{+}(x{+}1)*p[W][{-}1]{+}W/2)/W, \text{ and}$$

$$predSamples[x][y]=(predV[x][y]{+}predH[x][y]{+}1){>}{>}1,$$

where H is a height of the block, W is a width of the block, (x, y) are sample coordinates, >> is a right shift operator, log 2 is a logarithmic function, and p[ ][ ] indicates neighboring samples at a corresponding coordinate.

Optionally, in any of the preceding aspects, another implementation of the aspect provides that when the block is determined to be non-dyadic, the block is coded according to prediction sample values at a positions (x, y) (predSam-ples[x][y]) derived according to:

$$predV[x][y]=(((1<<\lfloor Log\ 2(H)\rfloor)-1-y)*p[x][-1]+$$
$$(y+1)*p[-1][H])<<\lfloor Log\ 2(W)\rfloor,$$

$$predH[x][y]=(((1<<\lfloor Log\ 2(W)\rfloor)-1-x)*p[-1][y]+$$
$$(x+1)*p[W][-1])<<\lfloor Log\ 2(H)\rfloor,\ and$$

$$predSamples[x][y]=(predV[x][y]+predH[x][y]+$$
$$(1<<\lfloor Log\ 2(W)\rfloor)*((1<<\lfloor Log\ 2(H)\rfloor))>>(\lfloor Log$$
$$2(W)\rfloor+\lfloor Log\ 2(H)\rfloor+1),$$

where H is a height of the block, W is a width of the block, (x, y) are sample coordinates, >> is a right shift operator, << is a left shift operators, log 2 is a logarithmic function, p[ ][ ] indicates neighboring samples at a corresponding coordinate, and [ ] is a floor function.

Optionally, in any of the preceding aspects, another implementation of the aspect provides that when the block is determined to be non-dyadic, the block is coded according to prediction sample values at a positions (x, y) (predSam-ples[x][y]) derived according to:

$$predV[x][y]=(((1<<\lceil Log\ 2(H)\rceil)-1-y)*p[x][-1]+$$
$$(y+1)*p[-1][H])<<\lceil Log\ 2(W)\rceil,$$

$$predH[x][y]=(((1<<\lceil Log\ 2(W)\rceil)-1-x)*p[-1][y]+$$
$$(x+1)*p[W][-1])<<\lceil Log\ 2(H)\rceil,\ and$$

$$predSamples[x][y]=(predV[x][y]+predH[x][y]+$$
$$(1<<\lceil Log\ 2(W)\rceil)*(((1<<\lceil Log\ 2(H)\rceil))>>(\lceil Log$$
$$2(W)\rceil+\lceil Log\ 2(H)\rceil+1),$$

where H is a height of the block, W is a width of the block, (x, y) are sample coordinates, >> is a right shift operator, << is a left shift operators, log 2 is a logarithmic function, p[ ][ ] indicates neighboring samples at a corresponding coordinate, and ⌈ ⌉ is a ceiling function.

A second aspect relates to a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

A third aspect relates to an apparatus for processing video data comprising: a processor; and a non-transitory memory with instructions thereon, wherein the instructions upon execution by the processor, cause the processor to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 9 is a schematic diagram of example intra prediction modes.

FIG. 17 is a schematic diagram of an example of wide angle intra prediction (WAIP).

FIG. 21 is a flowchart for an example method of video processing.

DETAILED DESCRIPTION

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementa-tions, drawings, and techniques illustrated below, including the exemplary designs and implementations illustrated and described herein, but may be modified within the scope of the appended claims along with their full scope of equiva-lents.

This document is related to image/video coding, and more particularly to intra-coding on some special kinds of blocks. The disclosed mechanisms may be applied to the video coding standards such as High Efficiency Video Coding (HEVC) and/or Versatile Video Coding (VVC). Such mechanisms may also be applicable to other video coding standards and/or video codecs.

Video coding standards have evolved primarily through the development of the International Telecommunication Union (ITU) Telecommunication Standardization Sector (ITU-T) and International Organization for Standardization (ISO)/International Electrotechnical Commission (IEC) standards. The ITU-T produced a H.261 standard and a H.263 standard, ISO/IEC produced Motion Picture Experts Group (MPEG) phase one (MPEG-1) and MPEG phase four (MPEG-4) Visual standards, and the two organizations jointly produced the H.262/MPEG phase two (MPEG-2) Video standard, the H.264/MPEG-4 Advanced Video Coding (AVC) standard, and the H.265/High Efficiency Video Coding (HEVC) standard. Since H.262, the video coding standards are based on a hybrid video coding structure that utilizes a temporal prediction plus a transform coding.

Figure 1:
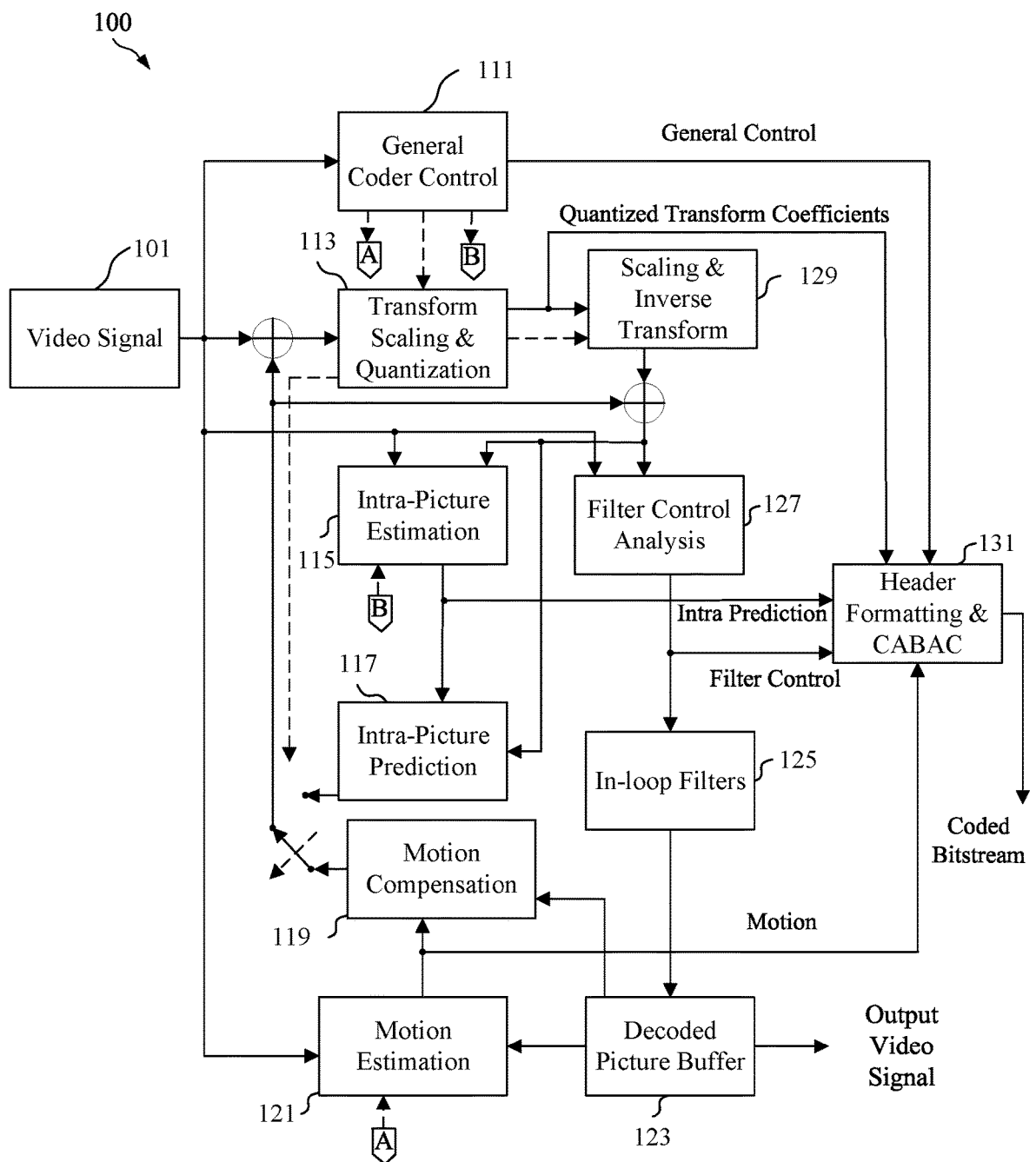
FIG. 1 is a schematic diagram of an example coding and decoding (codec) for video coding.

FIG. 1 is a schematic diagram of an example coding and decoding (codec) for video coding, for example according to HEVC. For example, codec 100 provides functionality to support converting a video file into a bitstream by encoding and/or decoding pictures. Codec 100 is generalized to depict components employed in both an encoder and a decoder. Codec 100 receives a stream of pictures as a video signal 101 and partitions the pictures. Codec 100 then compresses the pictures in the video signal 101 into a coded bitstream when acting as an encoder. When acting as a decoder, codec 100 generates an output video signal from the bitstream. The codec 100 includes a general coder control component 111, a transform scaling and quantization component 113, an intra-picture estimation component 115, an intra-picture prediction component 117, a motion compensation component 119, a motion estimation component 121, a scaling and inverse transform component 129, a filter control analysis component 127, an in-loop filters component 125, a decoded picture buffer component 123, and a header formatting and context adaptive binary arithmetic coding (CABAC) component 131. Such components are coupled as shown. In FIG. 1, black lines indicate movement of data to be encoded/decoded while dashed lines indicate movement of control data that controls the operation of other components. The components of codec 100 may all be present in the encoder. The decoder may include a subset of the components of codec 100. For example, the decoder may include the intra-picture prediction component 117, the motion compensation component 119, the scaling and inverse transform component 129, the in-loop filters component 125, and the decoded picture buffer component 123. These components are now described.

The video signal 101 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a coding tree unit (CTU) that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The video signal 101 is forwarded to the general coder control component 111, the transform scaling and quantization component 113, the intra-picture estimation component 115, the filter control analysis component 127, and the motion estimation component 121 for compression.

The general coder control component 111 is configured to make decisions related to coding of the images of the video sequence into the bitstream according to application constraints. For example, the general coder control component 111 manages optimization of bitrate/bitstream size versus reconstruction quality. Such decisions may be made based on storage space/bandwidth availability and image resolution requests. The general coder control component 111 also manages buffer utilization in light of transmission speed to mitigate buffer underrun and overrun issues. To manage these issues, the general coder control component 111 manages partitioning, prediction, and filtering by the other components. For example, the general coder control component 111 may increase compression complexity to increase resolution and increase bandwidth usage or decrease compression complexity to decrease resolution and bandwidth usage. Hence, the general coder control component 111 controls the other components of codec 100 to balance video signal reconstruction quality with bit rate concerns. The general coder control component 111 creates control data, which controls the operation of the other components. The control data is also forwarded to the header formatting and CABAC component 131 to be encoded in the bitstream to signal parameters for decoding at the decoder.

The video signal 101 is also sent to the motion estimation component 121 and the motion compensation component 119 for inter prediction. A video unit (e.g., a picture, a slice, a CTU, etc.) of the video signal 101 may be divided into multiple blocks. Motion estimation component 121 and the motion compensation component 119 perform inter predictive coding of the received video block relative to one or more blocks in one or more reference pictures to provide temporal prediction. Codec 100 may perform multiple coding passes, e.g., to select an appropriate coding mode for each block of video data.

Motion estimation component 121 and motion compensation component 119 may be highly integrated, but are illustrated separately for conceptual purposes. Motion estimation, performed by motion estimation component 121, is the process of generating motion vectors, which estimate motion for video blocks. A motion vector, for example, may indicate the displacement of a coded object in a current block relative to a reference block. A reference block is a block that is found to closely match the block to be coded, in terms of pixel difference. Such pixel differences may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into coding blocks (CBs) for inclusion in CUs. A CU can be encoded as a prediction unit (PU) containing prediction data and/or a transform unit (TU) containing transformed residual data for the CU. The motion estimation component 121 generates motion vectors, PUs, and TUs by using a rate-distortion analysis as part of a rate distortion optimization process. For example, the motion estimation component 121 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec 100 may calculate values for sub-integer pixel positions of reference pictures stored in decoded picture buffer component 123. For example, a video codec, such as codec 100, may interpolate values of one-quarter pixel positions, one-eighth pixel positions, or other fractional pixel positions of the reference picture. Therefore, motion estimation component 121 may perform a motion search relative to the full pixel positions and fractional pixel positions and output a motion vector with fractional pixel precision. The motion estimation component 121 calculates a motion vector for a PU of a video block in an inter-coded slice by comparing the position of the PU to the position of a reference block of a reference picture. Motion estimation component 121 outputs the calculated motion vector as motion data to header formatting and CABAC component 131 for encoding and to the motion compensation component 119.

Motion compensation, performed by motion compensation component 119, may involve fetching or generating a reference block based on the motion vector determined by motion estimation component 121. Motion estimation component 121 and motion compensation component 119 may be functionally integrated, in some examples. Upon receiving the motion vector for the PU of the current video block, motion compensation component 119 may locate the reference block to which the motion vector points. A residual video block is then formed by subtracting pixel values of the reference block from the pixel values of the current block being coded, forming pixel difference values. In general, motion estimation component 121 performs motion estimation relative to luma components, and motion compensation component 119 uses motion vectors calculated based on the luma components for both chroma components and luma components. The reference block and residual block are forwarded to transform scaling and quantization component 113.

The video signal 101 is also sent to intra-picture estimation component 115 and intra-picture prediction component 117. As with motion estimation component 121 and motion compensation component 119, intra-picture estimation component 115 and intra-picture prediction component 117 may be highly integrated, but are illustrated separately for conceptual purposes. The intra-picture estimation component 115 and intra-picture prediction component 117 intra-predict a current block relative to blocks in a current picture, as an alternative to the inter prediction performed by motion estimation component 121 and motion compensation component 119 between pictures, as described above. In particular, the intra-picture estimation component 115 determines an intra-prediction mode to use to encode a current block. In some examples, intra-picture estimation component 115 selects an appropriate intra-prediction mode to encode a current block from multiple tested intra-prediction modes. The selected intra-prediction modes are then forwarded to the header formatting and CABAC component 131 for encoding.

For example, the intra-picture estimation component 115 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 115 calculates ratios from the distortions and rates for the various encoded blocks to determine which intra-prediction mode exhibits the best rate-distortion value for the block. In addition, intra-picture estimation component 115 may be configured to code depth blocks of a depth map using a depth modeling mode (DMM) based on rate-distortion optimization (RDO).

The intra-picture prediction component 117 may generate a residual block from the reference block based on the selected intra-prediction modes determined by intra-picture estimation component 115 when implemented on an encoder or read the residual block from the bitstream when implemented on a decoder. The residual block includes the difference in values between the reference block and the original block, represented as a matrix. The residual block is then forwarded to the transform scaling and quantization component 113. The intra-picture estimation component 115 and the intra-picture prediction component 117 may operate on both luma and chroma components.

The transform scaling and quantization component 113 is configured to further compress the residual block. The transform scaling and quantization component 113 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 113 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 113 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 113 may then perform a scan of the matrix including the quantized transform coefficients. The quantized transform coefficients are forwarded to the header formatting and CABAC component 131 to be encoded in the bitstream.

The scaling and inverse transform component 129 applies a reverse operation of the transform scaling and quantization component 113 to support motion estimation. The scaling and inverse transform component 129 applies inverse scaling, transformation, and/or quantization to reconstruct the residual block in the pixel domain, e.g., for later use as a reference block for another current block. The motion estimation component 121 and/or motion compensation component 119 may calculate a further reference block by adding the residual block back to a previous reference block for use in motion estimation of a later block/frame. Filters are applied to the reconstructed reference blocks to mitigate artifacts created during scaling, quantization, and transform.

Such artifacts could otherwise cause inaccurate prediction (and create additional artifacts) when subsequent blocks are predicted.

The filter control analysis component 127 and the in-loop filters component 125 apply the filters to the residual blocks and/or to reconstructed picture blocks. For example, the transformed residual block from the scaling and inverse transform component 129 may be combined with a corresponding reference block from intra-picture prediction component 117 and/or motion compensation component 119 to reconstruct the original image block. The filters may then be applied to the reconstructed image block. In some examples, the filters may instead be applied to the residual blocks. As with other components in FIG. 1, the filter control analysis component 127 and the in-loop filters component 125 are highly integrated and may be implemented together, but are depicted separately for conceptual purposes. Filters applied to the reconstructed reference blocks are applied to particular spatial regions and include multiple parameters to adjust how such filters are applied. The filter control analysis component 127 analyzes the reconstructed reference blocks to determine where such filters should be applied and sets corresponding parameters. Such data is forwarded to the header formatting and CABAC component 131 as filter control data for encoding. The in-loop filters component 125 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 123 for later use in motion estimation as discussed above. When operating as a decoder, the decoded picture buffer component 123 stores and forwards the reconstructed and filtered blocks toward a display as part of an output video signal. The decoded picture buffer component 123 may be any memory device capable of storing prediction blocks, residual blocks, and/or reconstructed image blocks.

The header formatting and CABAC component 131 receives the data from the various components of codec 100 and encodes such data into a coded bitstream for transmission toward a decoder. Specifically, the header formatting and CABAC component 131 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 101. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figures 2, 3:
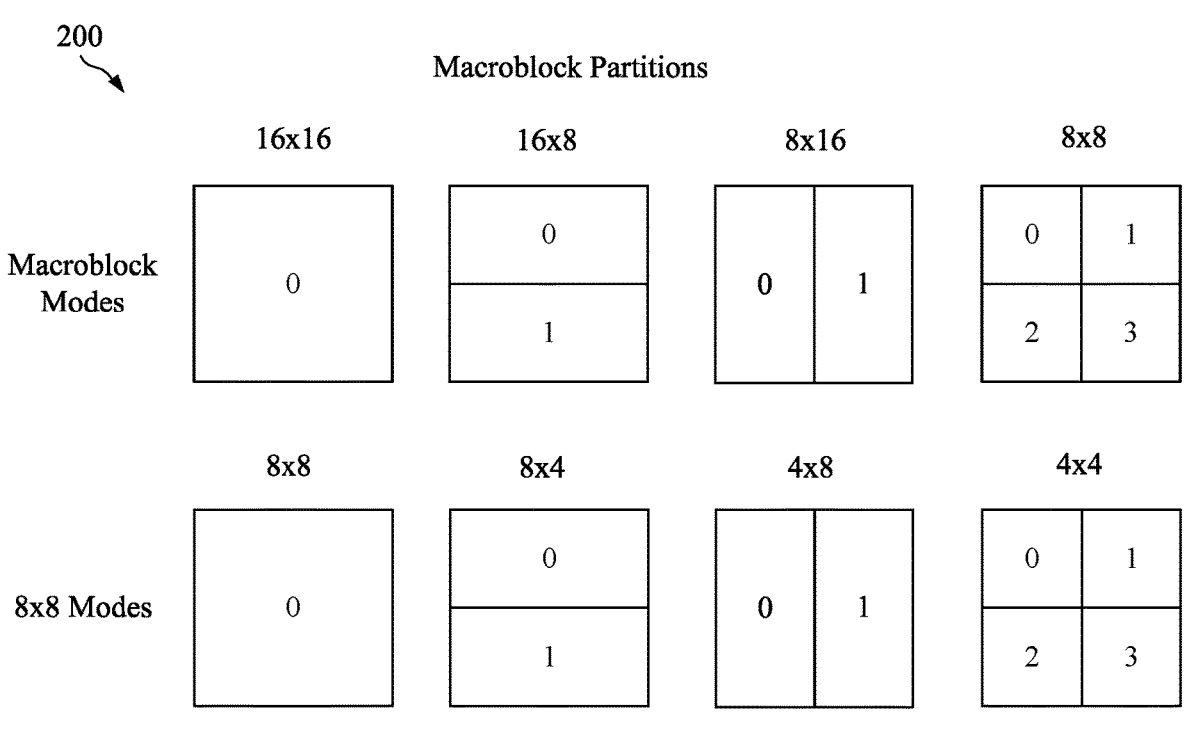
FIG. 2 is a schematic diagram of example macroblock partitions.
FIG. 3 is a schematic diagram of example modes for partitioning coding blocks, for example according to High Efficiency Video Coding (HEVC).

In order to encode and/or decode a picture as described above, the picture is first partitioned. FIG. 2 is a schematic diagram of example macroblock partitions 200, which can be created by a partition tree structure pursuant to H.264/AVC. The core of the coding layer in such standards is the macroblock, containing a 16×16 block of luma samples and, in the case of 4:2:0 color sampling, two corresponding 8×8 blocks of chroma samples. An intra-coded block uses spatial prediction to exploit spatial correlation among pixels. Two partitions are defined for an intra-coded block, namely a 16×16 sub-block and 4×4 sub-block. An inter-coded block uses temporal prediction, instead of spatial prediction, by estimating motion among pictures. Motion can be estimated independently for either a 16×16 macroblock or any sub-macroblock partitions. An inter-coded block can be partitioned into a 16×8 sub-block, an 8×16 sub-block, an 8×8 sub-block, an 8×4 sub-block, a 4×8 sub-block, and/or a 4×4 sub-block. All such values are measured in a number of samples. A Sample is a luma (light) value or chroma (color) value at a pixel.

FIG. 3 is a schematic diagram of example modes 300 for partitioning coding blocks, for example according to HEVC. In HEVC, a picture is partitioned into CTUs. A CTU is split into CUs by using a quadtree structure denoted as a coding tree to adapt to various local characteristics. The decision whether to code a picture area using inter-picture (temporal) or intra-picture (spatial) prediction is made at the CU level. Each CU can be further split into one, two, or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One feature of the HEVC structure is that HEVC has multiple partition conceptions including CU, PU, and TU.

Various features involved in hybrid video coding using HEVC are highlighted as follows. HEVC includes the CTU, which is analogous to the macroblock in AVC. The CTU has a size selected by the encoder and can be larger than a macroblock. The CTU includes a luma coding tree block (CTB), corresponding chroma CTBs, and syntax elements. The size of a luma CTB, denoted as L×L, can be chosen as L=16, 32, or 64 samples with the larger sizes resulting in better compression. HEVC then supports a partitioning of the CTBs into smaller blocks using a tree structure and quadtree-like signaling.

The quadtree syntax of the CTU specifies the size and positions of corresponding luma and chroma CBs. The root of the quadtree is associated with the CTU. Hence, the size of the luma CTB is the largest supported size for a luma CB. The splitting of a CTU into luma and chroma CBs is signaled jointly. One luma CB and two chroma CBs, together with associated syntax, form a coding unit (CU). A CTB may contain only one CU or may be split to form multiple CUs. Each CU has an associated partitioning into prediction units (PUs) and a tree of transform units (TUs). The decision of whether to code a picture area using inter picture or intra picture prediction is made at the CU level. A PU partitioning structure has a root at the CU level. Depending on the basic prediction-type decision, the luma and chroma CBs can then be further split in size and predicted from luma and chroma prediction blocks (PBs) according to modes 300. HEVC supports variable PB sizes from 64×64 down to 4×4 samples. As shown, modes 300 can split a CB of size M pixels by M pixels into an M×M block, a M/2×M block, a M×M/2 block, a M/2×M/2 block, a M/4×M (left) block, a M/4×M (right) block, a M×M/4 (up) block, and/or a M×M/4 (down) block. It should be noted that the modes 300 for splitting CBs into PBs are subject to size constraints. Further, only M×M and M/2×M/2 are supported for intra picture predicted CBs.

Figures 4, 5:
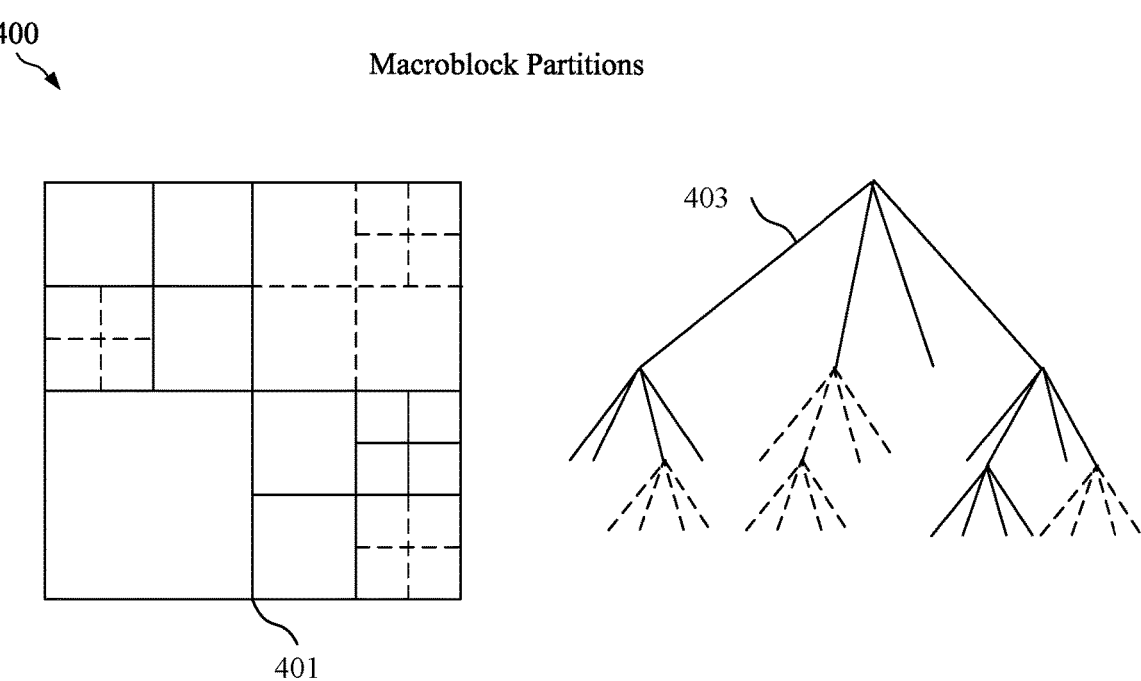
FIG. 4 is a schematic diagram of example method for partitioning a picture for coding residual.
FIG. 5 is a schematic diagram of example method for partitioning a picture, for example according to a quad tree binary tree (QTBT) structure.

FIG. 4 is a schematic diagram of example method 400 for partitioning a picture for coding residual, for example according to HEVC. As noted above, blocks are coded by reference to reference blocks. A difference between values of a current block and the reference blocks is known as the residual. Method 400 is employed to compress the residual. For example, the prediction residual is coded using block transforms. Method 400 employs a TU tree structure 403 to partition a CTB 401 and included CBs for application of transform blocks (TBs). Method 400 illustrates the subdivision of a CTB 401 into CBs and TBs. Solid lines indicate CB boundaries and dotted lines indicate TB boundaries. The TU tree structure 403 is an example quadtree that partitions the CTB 401. A transform, such as discrete cosine transform (DCT), is applied to each TB. The transform converts the residual into transform coefficients that can be represented using less data than the uncompressed residual. The TU tree structure 403 has a root at the CU level. The luma CB residual area may be identical to the luma TB area or may be further split into smaller luma TBs. The same applies to the chroma TBs. Integer basis transform functions similar to those of a DCT are defined for the square TB sizes 4×4, 8×8, 16×16, and 32×32. For the 4×4 transform of luma intra picture prediction residuals, an integer transform derived from a form of DST is alternatively specified.

A quadtree plus binary tree block structure with larger CTUs in Joint Exploration Model (JEM) is discussed below. Joint Video Exploration Team (JVET) was founded by Video Coding Experts group (VCEG) and MPEG to explore video coding technologies beyond HEVC. JVET has adopted many improvements included such improvements into a reference software named Joint Exploration Model (JEM).

FIG. 5 is a schematic diagram of example method 500 for partitioning a picture, for example according to a quad tree binary tree (QTBT) structure 501. A tree representation 503 of the QTBT structure 501 is also shown. Unlike the partitioning structures in HEVC, the QTBT structure 501 removes the concepts of multiple partition types. For example, the QTBT structure 501 removes the separation of the CU, PU, and TU concepts, and supports more flexibility for CU partition shapes. In the QTBT structure 501, a CU can have either a square or rectangular shape. In method 500, a CTU is first partitioned by a quadtree structure. The quadtree leaf nodes are further partitioned by a binary tree structure. Symmetric horizontal splitting and symmetric vertical splitting are two splitting types used in the binary tree. The binary tree leaf nodes are called CUs, and that segmentation is used for prediction and transform processing without further partitioning. This causes the CU, PU, and TU to have the same block size in the QTBT structure 501. In the JEM, a CU sometimes includes CBs of different color components. For example, one CU may contain one luma CB and two chroma CBs in the case of unidirectional inter prediction (P) and bidirectional inter prediction (B) slices of the 4:2:0 chroma format. Further, the CU sometimes includes a CB of a single component. For example, one CU may contain only one luma CB or just two chroma CBs in the case of intra prediction (I) slices.

The following parameters are defined for the QTBT partitioning scheme. The CTU size is the root node size of a quadtree, which is the same concept as in HEVC. Minimum quad tree size (MinQTSize) is the minimum allowed quadtree leaf node size. Maximum binary tree size (MaxBTSize) is the maximum allowed binary tree root node size. Maximum binary tree depth (MaxBTDepth) is the maximum allowed binary tree depth. Minimum binary tree size (MinBTSize) is the minimum allowed binary tree leaf node size.

In one example of the QTBT structure 501, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (the MinQTSize) to 128×128 (the CTU size). If the leaf quadtree node is 128×128, the node is not to be further split by the binary tree since the size exceeds the MaxBTSize (e.g., 64×64). Otherwise, the leaf quadtree node can be further partitioned by the binary tree. Therefore, the quadtree leaf node is also the root node for the binary tree and has the binary tree depth as 0. When the binary tree depth reaches MaxBTDepth (e.g., 4), no further splitting is considered. When the binary tree node has width equal to MinBTSize (e.g., 4), no further horizontal splitting is considered. Similarly, when the binary tree node has a height equal to MinBTSize, no further vertical splitting is considered. The leaf nodes of the binary tree are further processed by prediction and transform processing without any further partitioning. In the JEM, the maximum CTU size is 256×256 luma samples.

Method 500 illustrates an example of block partitioning by using the QTBT structure 501, and tree representation 503 illustrates the corresponding tree representation. The solid lines indicate quadtree splitting and dotted lines indicate binary tree splitting. In each splitting (e.g., non-leaf) node of the binary tree, one flag is signaled to indicate which splitting type (e.g., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 subblocks with an equal size.

In addition, the QTBT scheme supports the ability for the luma and chroma to have a separate QTBT structure 501. For example, in P and B slices the luma and chroma CTBs in one CTU share the same QTBT structure 501. However, in I slices the luma CTB is partitioned into CUs by a QTBT structure 501, and the chroma CTBs are partitioned into chroma CUs by another QTBT structure 501. Accordingly, a CU in an I slice can include a coding block of the luma component or coding blocks of two chroma components. Further, a CU in a P or B slice includes coding blocks of all three color components. In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

Figures 6, 7:
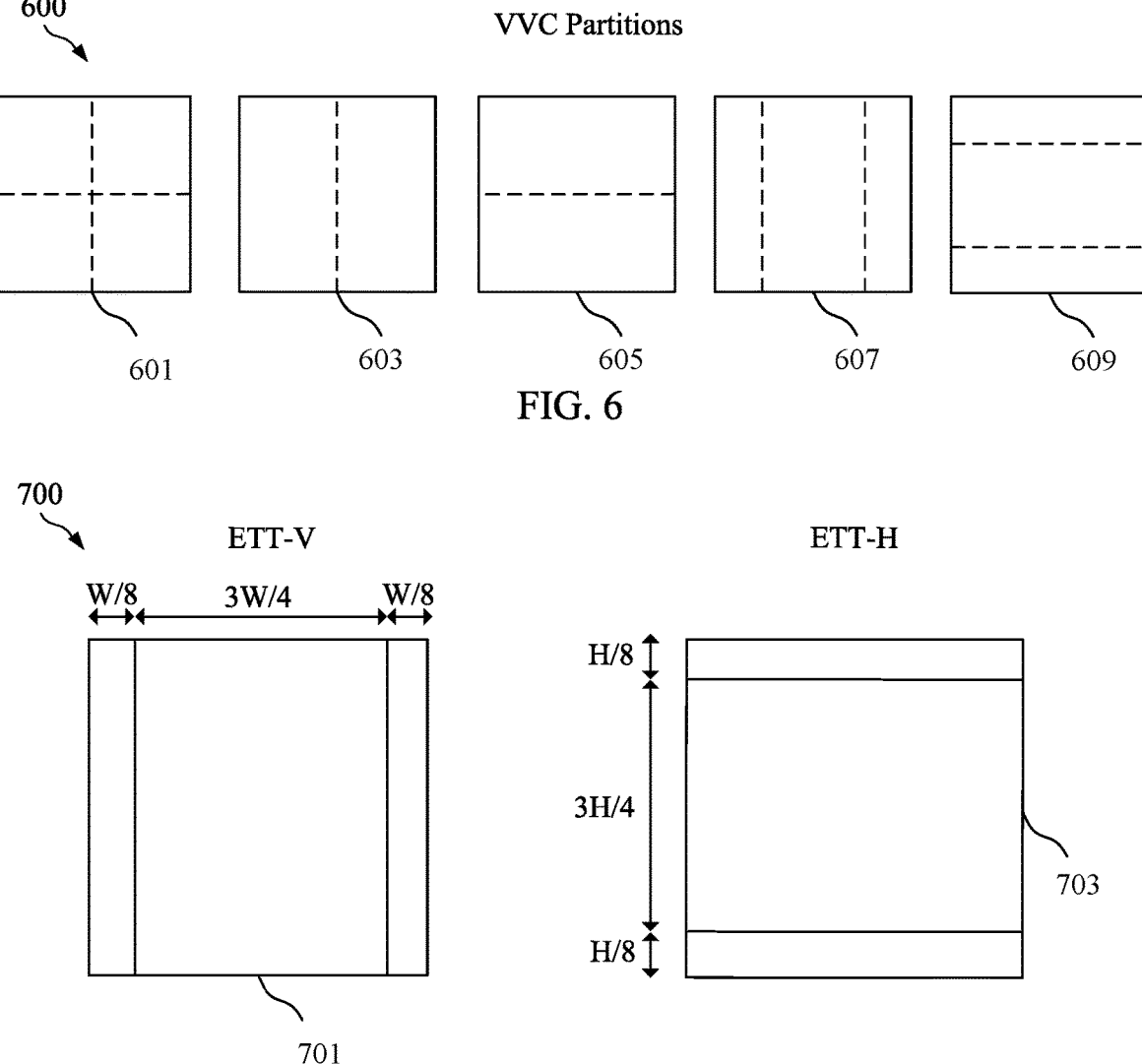
FIG. 6 is a schematic diagram of example partitioning structures used in Versatile Video Coding (VVC).
FIG. 7 is a schematic diagram of example Extended Ternary-Tree (ETT) partitioning structures.

Triple-tree partitioning for VVC is now discussed. FIG. 6 is a schematic diagram 600 of example partitioning structures used in VVC. As shown, split types other than quadtree and binary-tree are supported in VVC. For example, schematic diagram 600 includes a quad tree partition 601, a vertical binary tree partition 603, a horizontal binary tree partition 605, a vertical triple tree partition 607, and a horizontal triple tree partition 609. This approach introduces two triple tree (TT) partitions in addition to the quad tree and binary trees.

In an example implementation, two levels of trees are employed including a region tree (a quad-tree) and a prediction tree (binary-tree or triple-tree). A CTU is first partitioned by a region tree (RT). A RT leaf may be further split with prediction tree (PT). A PT leaf may also be further split with PT until a max PT depth is reached. A PT leaf is a basic coding unit. The PT may also be called a CU for convenience. In an example implementation, a CU cannot be further split. Prediction and transform are both applied on CU in the same way as JEM. The whole partition structure is named multiple-type-tree.

FIG. 7 is a schematic diagram 700 of example ETT partitioning structures, including an ETT vertical (ETT-V) split 701 and an ETT horizontal (ETT-H) split 703. When employing ETT, a block with dimensions width times height (W×H) is split into three partitions with dimensions W1×H1, W2×H2, and W3×H3. W1, W2, W3, H1, H2, H3 are all integers. In an example, and at least one of the parameters is not in the form of power of 2. W1, W2, and W3 are widths of resulting sub-blocks. H1, H2, and H3 are heights of resulting sub-blocks. In one example, W2 cannot be in a form of W2=2N2 with any positive integer N2. In another example, H2 cannot be in a form of H2=$2^{N2}$ with any positive integer N2. In one example, at least one of the parameters is in the form of power of 2. In one example, W1 is in a form of W1=$2^{N1}$ with a positive integer N1. In another example, H1 is in a form of H1=$2^{N1}$ with a positive integer N1.

In one example, ETT only splits one partition in a vertical direction, for example where W1=a1\*W, W2=a2\*W, and W3=a3\*W, where a1+a2+a3=1, and where H1=H2=H3=H. This kind of ETT is vertical split and may be referred to as ETT-V. In one example, ETT-V split 701 can be used where W1=W/8, W2=3\*W/4, W3=W/8, and H1=H2=H3=H. In one example, ETT only splits one partition in horizontal direction, for example where H1=a1\*H, H2=a2\*H, and H3=a3\*H, where a1+a2+a3=1, and where W1=W2=W3=W. This kind of ETT is a horizontal split and may be referred to as ETT-H. In one example, ETT-H split 703 can be used where H1=H/8, H2=3\*H/4, H3=H/8, and W1=W2=W3=W.

Figure 8:
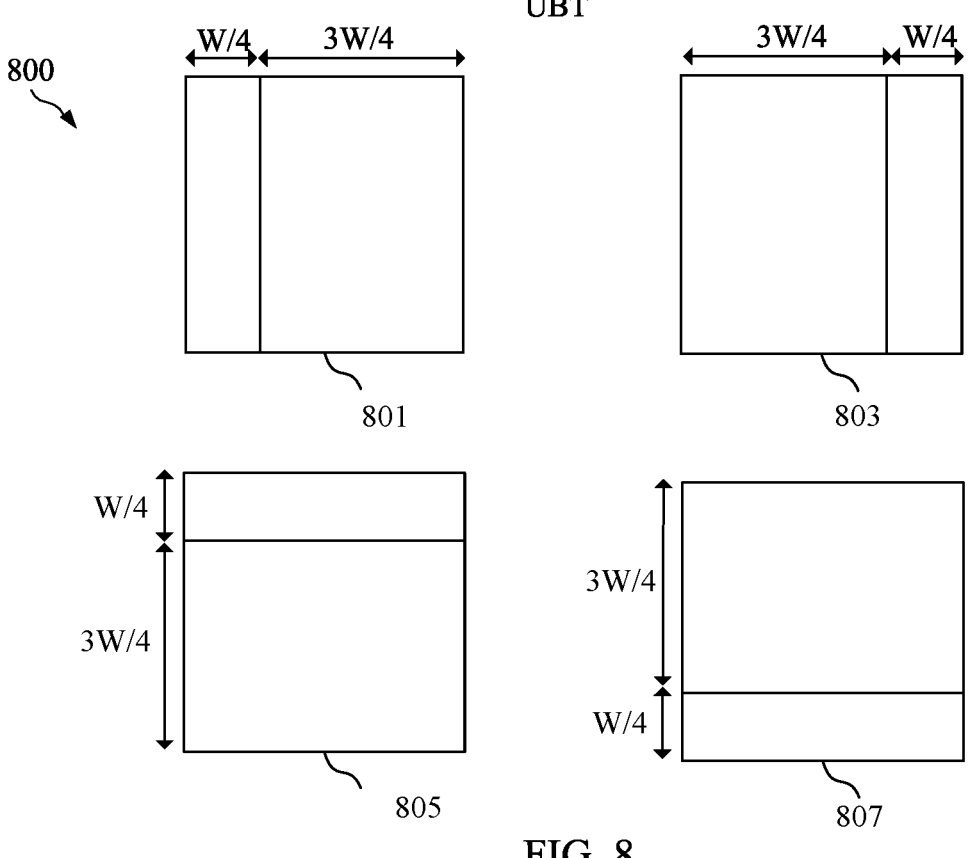
FIG. 8 is a schematic diagram of example 1/4 Unsym-metric Binary Tree (UBT) partitioning structures.

FIG. 8 is a schematic diagram 800 of example 1/4 UBT partitioning structures, which includes vertical UBT (UBT-V) partitions and horizontal UBT (UBT-H) partitions. A block of dimensions W×H can be split into two sub-blocks dimensions W1×H1 and W2×H2, where one of the sub-blocks is a dyadic block and the other is a non-dyadic block. Such a split is named as Unsymmetric Binary Tree (UBT) split. In one example, W1=a×W, W2=(1−a)×W, and H1=H2=H. In such a case, the partition may be called a vertical UBT (UBT-V). In one example, a may be smaller than 1/2, such as 1/4, 1/8, 1/16, 1/32, 1/64, etc. In such a case, the partition may be called a Type 0 UBT-V, an example of which is shown as split 801. In one example, a may be larger than 1/2, such as 3/4, 7/8, 15/16, 31/32, 63/64, etc. In such a case, the partition is called a Type 1 UBT-V, an example of which is shown as split 803. In one example, H1=a×H, H2=(1−a)×H, W1=W2=W. In such a case, the partition may be called a horizontal UBT (UBT-H). In one example, a may be smaller than 1/2, such as 1/4, 1/8, 1/16, 1/32, 1/64, etc. In such a case, the partition is called a Type 0 UBT-H, an example of which is shown as split 805. In one example, a may be larger than 1/2, such as 3/4, 7/8, 15/16, 31/32, 63/64, etc. In such a case, the partition may be called a Type 1 UBT-H, an example of which is shown as split 807.

Intra prediction, for example as used in HEVC/H.265, is now discussed. Intra prediction codes a current block by reference to a reference block in the same picture. In this way, coding each sample (e.g., pixel) of the block can be avoided. Instead, the current block is matched to reference block that contains the closest sample values to the current block. An intra prediction mode is then coded. Intra prediction modes include a group of directional modes, each of which is a vector that points in a predefined direction. Intra prediction modes also include a planar mode and a direct current (DC) mode, each of which employ averages of multiple reference blocks. By employing intra prediction modes, the block is coded as a prediction mode value instead of as a group of samples with corresponding sample values, which may include both luma and chroma components. Any differences between the sample values of the current block and the sample values of the reference block(s) are coded as residual.

FIG. 9 is a schematic diagram 900 of example intra prediction modes, which may be employed in HEVC. Intra prediction, also known as intra mode coding, may employ sixty seven intra prediction modes in HEVC. To capture arbitrary edge directions presented in natural video, the number of directional intra modes is extended from thirty-three to sixty-five in intra prediction. The directional modes are depicted as solid lines with arrows in diagram 900, along with the planar and DC modes. These denser directional intra prediction modes apply for all block sizes and for both luma and chroma intra predictions.

Some example angular intra prediction directions are defined from 45 degrees to −135 degrees in clockwise direction as shown in diagram 900. In VVC test model version two (VTM2), several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, e.g., 67, and the intra mode coding is unchanged. In the HEVC, every intra-coded block has a square shape and the length of each side is a power of two. Thus, no division operations are employed to generate an intra-predictor using DC mode. In VTM2, blocks can have a rectangular shape that necessitates the use of a division operation per block in the general case. To avoid division operations for DC prediction, only the longer side is used to compute the average for non-square blocks.

Figures 10, 11:
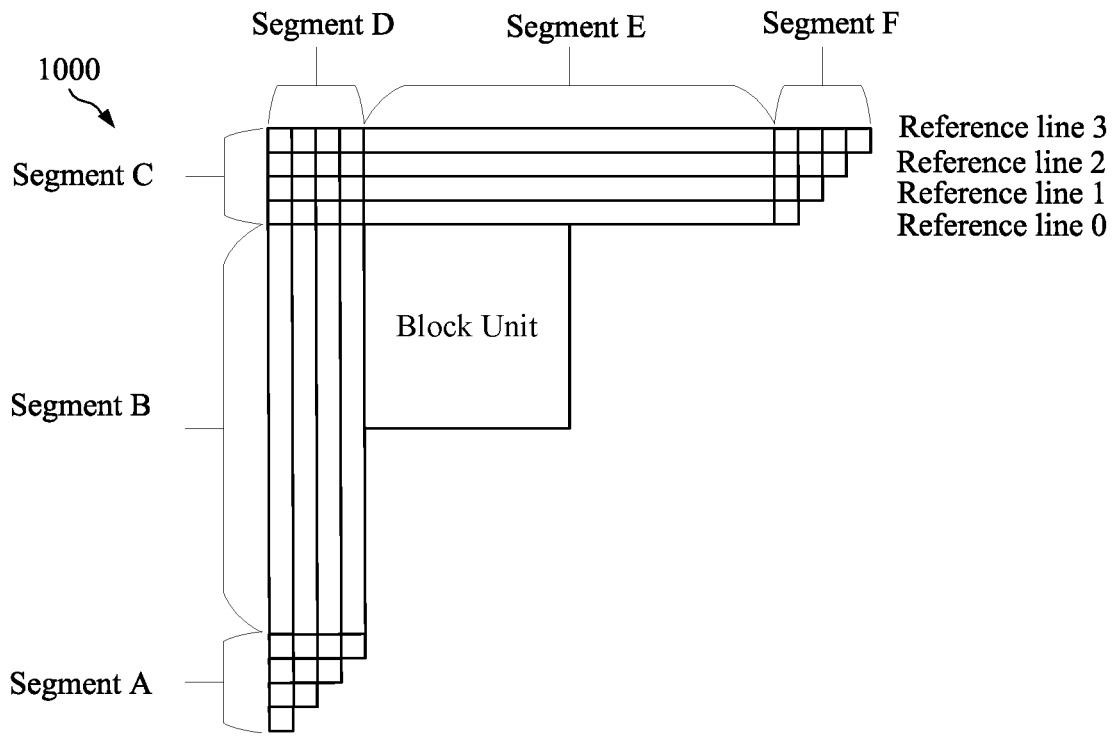
FIG. 10 is a schematic diagram of an example block employing multiple reference lines (MRLs).
FIG. 11 is a schematic diagram of an example partition employed by Intra subblock partitioning (ISP).

FIG. 10 is a schematic diagram 1000 of an example block employing multiple reference lines (MRLs). MRL intra prediction uses a plurality of reference lines for intra prediction. In diagram 1000, an example of four reference lines is depicted. The four reference lines are divided into segments A-F. The samples of segments A and F are not fetched from reconstructed neighboring samples, but are padded with the closest samples from Segment B and E, respectively. HEVC intra-picture prediction uses the nearest reference line (e.g., reference line 0). In MRL, two additional lines (e.g., reference line 1 and reference line 3) are used.

The index of the selected reference line (mrl_idx) is signaled and used to generate an intra predictor. For a reference line index, which is greater than zero, only additional reference line modes in the MPM list are signaled and only the MPM index without remaining mode is signaled. The reference line index is signaled before the intra prediction modes. Planar and DC modes are excluded from intra prediction modes when a nonzero reference line index is signaled. MRL is disabled for the first line of blocks inside a CTU to prevent using extended reference samples outside the current CTU line. Also, Position dependent intra prediction combination (PDPC) is disabled when an additional line is used.

Figure 12:
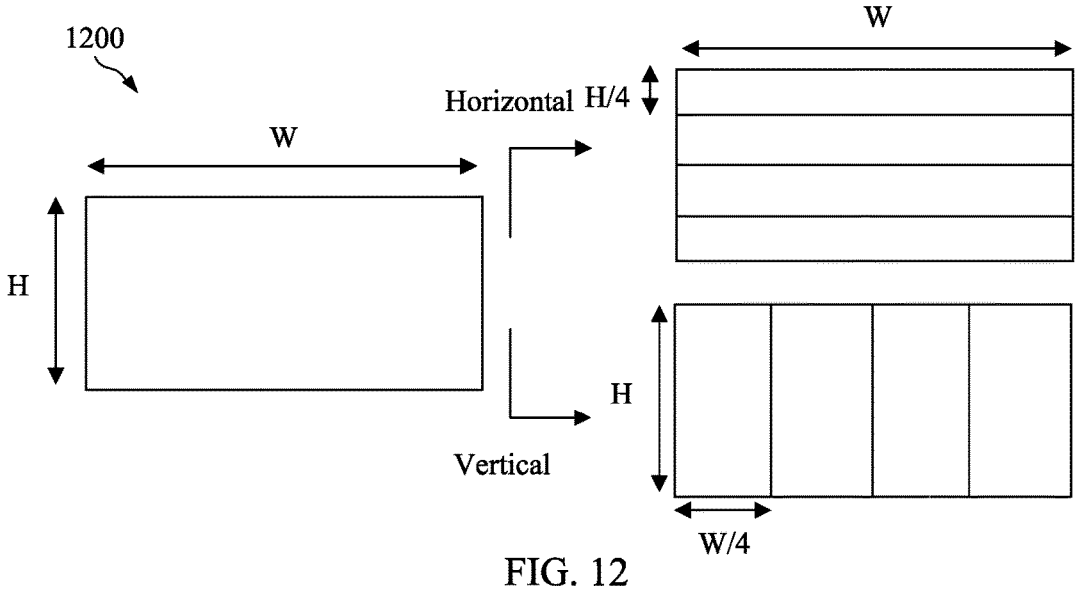
FIG. 12 is a schematic diagram of another example partition employed by ISP.

FIG. 11 is a schematic diagram 1100 of an example partition employed by Intra subblock partitioning (ISP). FIG. 12 is a schematic diagram 1200 of another example partition employed by ISP. In an example, ISP divides luma intra-predicted blocks vertically or horizontally into two or four sub-partitions, as shown in diagram 1100 and diagram 1200, respectively. The partitions are selected depending on the block size dimensions as shown in Table 1. All sub-partitions should fulfill the condition of having at least sixteen samples. For block sizes 4×N or N×4 (with N>8), when allowed, the 1×N or N×1 sub-partition may exist. Table 1 describes a number of sub-partitions depending on the block size, which can be denoted as maximum transform block size (maxTBSize).

TABLE 1

| Splitting direction | Block Size | Number of Sub-Partitions |
|---|---|---|
| N/A | minimum transform size | Not divided |
| 4 × 8: horizontal 8 × 4: vertical | 4 × 8 and 8 × 4 | 2 |
| Signaled | If neither 4 × 8 nor 8 × 4, and W <= maxTBSize and H <= maxTB Size | 4 |
| Horizontal | If not above cases and H > maxTBSize | 4 |
| Vertical | If not above cases and H > maxTBSize | 4 |

For each of these sub-partitions, a residual signal is generated by entropy decoding. As note above, the residual is the difference between the current block and the reference block. The residual is the converted into coefficients by employing transforms. In addition, the coefficients can be quantized for further compression. The coefficients for the residual signal are sent by the encoder. The decoder can then perform inverse quantization and apply an inverse transform to recover the residual. The sub-partition can then be intra predicted. Finally, the corresponding reconstructed samples are obtained by adding the residual signal to the prediction signal. Therefore, the reconstructed values of each sub-partition become available to generate the prediction of the next samples. The process can be repeated as needed to reconstruct an image. All sub-partitions share the same intra mode. Hereinafter, inner sub-partition is used to represent sub-partitions except the first sub-partition. If an ISP block is split in a horizontal direction, the first sub-partition is the above sub-partition. If an ISP block is split in a vertical direction, the first sub-partition is the left sub-partition.

The following is a specification of transform type horizontal (trTypeHor) and transform type vertical (trTypeVer) depending on the intra prediction mode (predModeIntra).

TABLE 2

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | (nTbW >=4 && nTbW <= 16) ? DST-VII:DCT-II | (nTbH >= 4 && nTbH <= 16) ? DST-VII:DCT-II |
| INTRA_ANGULAR33, INTRA_ANGULAR35 | DCT-II | DCT-II |

18

TABLE 2-continued

| predModeIntra | trTypeHor | trTypeVer |
|---|---|---|
| INTRA_ANGULAR2, INTRA_ANGULAR4, . . . , INTRA_ANGULAR28, INTRA_ANGULAR30, INTRA_ANGULAR39, INTRA_ANGULAR41, . . . , INTRA_ANGULAR63, INTRA_ANGULAR65 | (nTbW >= 4 && nTbW <= 16) ? DST-VII:DCT-II | DCT-II |
| INTRA_ANGULAR3, INTRA_ANGULAR5, . . . , INTRA_ANGULAR27, INTRA_ANGULAR29, INTRA_ANGULAR38, INTRA_ANGULAR40, . . . , INTRA_ANGULAR64, INTRA_ANGULAR66 | DCT-II | (nTbH >= 4 && nTbH <= 16) ? DST-VII:DCT-II |

The following are example syntax and semantics, and more specifically coding unit syntax.

| | Descriptor |
|---|---|
| coding_unit( x0, y0, cbWidth, cbHeight, treeType ) { | |
|   if( slice_type != I \| \| sps_ibc_enabled_flag ) { | |
|     if( treeType != DUAL_TREE_CHROMA ) | |
|     cu_skip_flag[ x0 ][ y0 ] | ae(v) |
|     if( cu_skip_flag[ x0 ][ y0 ] = = 0 && slice_type != I) | |
|       pred_mode_flag | ae(v) |
|     if( ( ( slice_type = = I && cu_skip_flag[ x0 ] [ y0 ] = = 0 ) \| \| | |
|      ( slice_type != I && CuPredMode[ x0 ][ y0 ] != MODE_INTRA ) ) && | |
|      sps_ibc_enabled_flag ) | |
|      pred_mode_ibc_flag | ae(v) |
|   } | |
|   if( CuPredMode[ x0 ][ y0 ] = = MODE_INTRA ) { | |
|     if( sps_pcm_enabled_flag && | |
|     cbWidth >= MinIpcmCbSize Y && cbWidth <= MaxIpcmCbSize Y && | |
|     cbHeight >= MinIpcmCbSizeY && cbHeight <= MaxIpcmCbSizeY ) | |
|     pcm_flag[ x0 ][ y0 ] | ae(v) |
|     if( pcm_flag[ x0 ][ y0 ] ) { | |
|      while( !byte_aligned( ) ) | |
|       pcm_alignment_zero_bit | f(1) |
|      pcm_sample( cbWidth, cbHeight, treeType) | |
|     } else { | |
|     if( treeType = = SINGLE_TREE \| \| treeType = = DUAL_TREE_LUMA ) { | |
|      if( ( y0 % CtbSizeY ) > 0) | |
|       intra_luma_ref_idx[ x0 ][ y0 ] | ae(v) |
|      if (intra_luma_ref_idx[ x0 ][ y0 ] = = 0 & & | |
|      ( cbWidth <= MaxTbSizeY \| \| cbHeight <= MaxTbSize Y ) | |
|      && ( cbWidth * cbHeight > MinTbSize Y * MinTbSize Y )) | |
|       intra_subpartitions_mode_flag[ x0 ][ y0 ] | ae(v) |

-continued

| | De-scriptor |
|---|---|
| if( intra_subpartitions_mode_flag[ x0 ][ y0 ] = = 1 && cbWidth <= MaxTbSizeY && cbHeight <= MaxTbSize Y ) | |
| intra_subpartitions_split_flag[ x0 ][ y0 ] | ae(v) |
| if( intra_luma_ref_idx[ x0 ][ y0 ] = = 0 && intra_subpartitions_mode_flag[ x0 ][ y0 ] = = 0) | |
| intra_luma_mpm_flag[ x0 ][ y0 ] | ae(v) |
| if( intra_luma_mpm_flag[ x0 ][ y0 ] ) | |
| intra_luma_mpm_idx[ x0 ][ y0 ] | ae(v) |
| else | |
| intra_luma_mpm_remainder[ x0 ][ y0 ] | ae(v) |
| } | |

-continued

| | De-scriptor |
|---|---|
| if( treeType = = SINGLE_TREE ǀ ǀ treeType = = DUAL_TREE_CHROMA ) | |
| intra_chroma_pred_mode[ x0 ][ y0 ] | ae(v) |
| } | |
| } else if( treeType != DUAL_TREE_CHROMA ) { /* MODE_INTER or MODE_IBC */ | |
| . . . | |
| } | |
| . . . | |
| } | |

An example transform unit syntax is disclosed.

| | Descriptor |
|---|---|
| transform_unit( x0, y0, tbWidth, tbHeight, treeType, subTuIndex ) { | |
|   if( treeType = = SINGLE_TREE ǀ ǀ treeType = = DUAL_TREE_LUMA ) { | |
|    if( ( IntraSubPartitionsSplitType = = ISP_NO_SPLIT && !( cu_sbt_flag && | |
|     ( ( subTuIndex == 0 && cu_sbt_pos_flag ) ǀ ǀ | |
|     ( subTuIndex = = 1 && !cu_sbt_pos_flag)) ) ) ǀ ǀ | |
|    ( IntraSubPartitionsSplitType != ISP_NO_SPLIT && | |
|    ( subTuIndex < NumIntraSubPartitions - 1 ǀ ǀ !InferTuCbfLuma ) ) ) | |
|    tu_cbf_luma[ x0 ][ y0 ] | ae(v) |
|   if (IntraSubPartitionsSplitType != ISP_NO_SPLIT ) | |
|    InferTuCbfLuma = InferTuCbfLuma && !tu_cbf_luma[ x0 ][ y0 ] | |
|   } | |
|   if( ( treeType = = SINGLE_TREE ǀ ǀ treeType = = DUAL_TREE_CHROMA ) { | |
|    if( ( IntraSubPartitionsSplitType = = ISP_NO_SPLIT && !( cu_sbt_flag && | |
|     ( ( subTuIndex == 0 && cu_sbt_pos_flag ) ǀ ǀ | |
|     ( subTuIndex == 1 && !cu_sbt_pos_flag) ) ) ) ǁ | |
|    ( IntraSubPartitionsSplitType != ISP_NO_SPLIT && | |
|    ( subTuIndex = = NumIntraSubPartitions - 1 ) ) ) { | |
|    tu_cbf_cb[ x0 ][ y0 ] | ae(v) |
|    tu_cbf_cr[ x0 ][ y0 ] | ae(v) |
|   } | |
|   } | |
|   if( IntraSubPartitionsSplitType != ISP_NO_SPLIT && | |
|    treeType = = SINGLE_TREE && subTuIndex = = NumIntraSubPartitions - 1 ) ) | |
|    xC = CbPosX[ x0 ][ y0 ] | |
|    yC = CbPos Y[ x0 ][ y0 ] | |
|    wC = CbWidth[ x0 ][ y0 ] / 2 | |
|    hC = CbHeight[ x0 ][ y0 ] / 2 | |
|   } else | |
|    xC = x0 | |
|    yC = y0 | |
|    wC = tbWidth / SubWidthC | |
|    hC = tbHeight / SubHeightC | |
|   } | |
|  if( ( tu_cbf_luma[ x0 ][ y0 ] ǀ ǀ tu_cbf_cb[ x0 ][ y0 ] ǀ ǀ tu_cbf_cr[ x0 ][ y0 ] ) && | |
|   treeType != DUAL_TREE_CHROMA ) { | |
|   if( cu_qp_delta_enabled_flag && !IsCuQpDeltaCoded ) { | |
|    cu_qp_delta_abs | ae(v) |
|    if( cu_qp_delta_abs ) | |
|     cu_qp_delta_sign_flag | ae(v) |
|   } | |
|  } | |
|  if( tu_cbf_luma[ x0 ][ y0 ] && treeType != DUAL_TREE_CHROMA | |
|   && ( tbWidth <= 32) && ( tbHeight <= 32) | |
|   && ( IntraSubPartitionsSplit[ x0 ][ y0 ] = = ISP_NO_SPLIT ) | |
|  && ( !cu_sbt_flag ) ) { | |
|   if( transform_skip_enabled_flag && tbWidth <= MaxTsSize && tbHeight <= MaxTsSize ) | |
|    transform_skip_flag[ x0 ][ y0 ] | ae(v) |
|   if( (( CuPredMode[ x0 ][ y0 ] != MODE_INTRA && sps_explicit_mts_inter_enabled_flag ) | |

-continued

| | Descriptor |
|---|---|
| | | ( CuPredMode[ x0 ][ y0 ] = = MODE_INTRA &&<br>sps_explicit_mts_intra_enabled_flag ))<br>  && (tbWidth <= 32 ) && (tbHeight <= 32 ) &&<br>( !transform_skip_flag[ x0 ][ y0 ] ) )<br>    tu_mts_idx[ x0 ][ y0 ] | ae(v) |
|   }<br>  if( tu_cbf_luma[ x0 ][ y0 ] )<br>    residual_coding( x0, y0, Log2( tbWidth), Log2( tbHeight), 0)<br>  if( tu_cbf_cb[ x0 ][ y0 ] )<br>    residual_coding( xC, yC, Log2( wC), Log2(hC), 1)<br>  if( tu_cbf_cr[ x0 ][ y0 ] )<br>    residual_coding( xC, yC, Log2(wC), Log2(hC), 2)<br>} | |

Intra_subpartitions_mode_flag[x0][y0] equal to 1 specifies that the current intra coding unit is partitioned into NumIntraSubPartitions[x0][y0] rectangular transform block subpartitions. Intra_subpartitions_mode_flag[x0][y0] equal to 0 specifies that the current intra coding unit is not partitioned into rectangular transform block subpartitions. When not present, intra_subpartitions_mode_flag[x0][y0] is inferred to be equal to 0. Intra_subpartitions_split_flag[x0][y0] specifies whether the intra subpartitions split type is horizontal or vertical. When not present, intra_subpartitions_split_flag[x0][y0] is inferred as follows. If cbHeight is greater than MaxTbSizeY, intra_subpartitions_split_flag[x0][y0] is inferred to be equal to 0. Otherwise (cbWidth is greater than MaxTbSizeY), intra_subpartitions_split_flag[x0][y0] is inferred to be equal to 1.

The variable IntraSubPartitionsSplitType specifies the type of split used for the current luma coding block as illustrated in Table 7-9. IntraSubPartitionsSplitType is derived as follows. If intra_subpartitions_mode_flag[x0][y0] is equal to 0, IntraSubPartitionsSplitType is set equal to 0. Otherwise, the IntraSubPartitionsSplitType is set equal to 1+intra_subpartitions_split_flag[x0][y0].

TABLE 7-9

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block subpartitions into which an intra luma coding block is divided. NumIntraSubPartitions is derived as follows. If IntraSubPartitionsSplitType is equal to ISP_NO_SPLIT, NumIntraSubPartitions is set equal to 1. Otherwise, if one of the following conditions is true, NumIntraSubPartitions is set equal to 2. A first condition is cbWidth is equal to 4 and cbHeight is equal to 8. A second condition is cbWidth is equal to 8 and cbHeight is equal to 4. Otherwise, NumIntraSubPartitions is set equal to 4.

Affine linear weighted intra prediction (ALWIP), also known as matrix based intra prediction (MIP) is now discussed. Also, generation of the reduced prediction signal by matrix vector multiplication is discussed. The neighboring reference samples are firstly down-sampled via averaging to generate the reduced reference signal $bdry_{red}$. Then, the reduced prediction signal $pred_{red}$ is computed by calculating a matrix vector product and adding an offset according to:

$$pred_{red}=A \cdot bdry_{red}+b.$$

Here, A is a matrix that has $W_{red} \cdot H_{red}$ rows and 4 columns if W=H=4 and 8 columns in all other cases. b is a vector of size $W_{red} \cdot H_{red}$.

Figure 13:
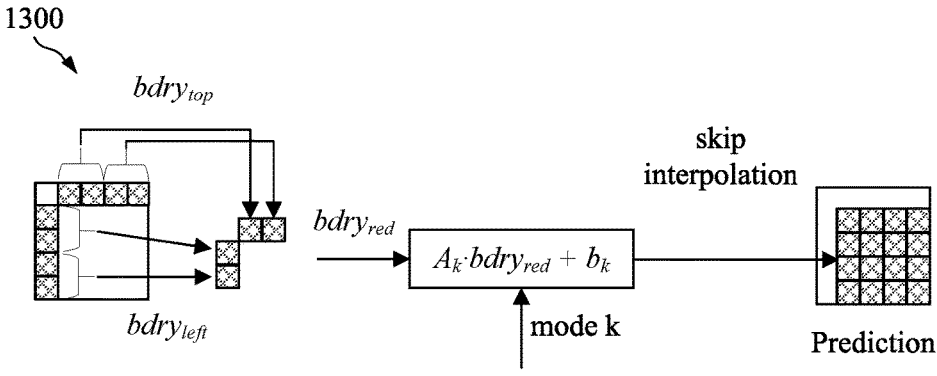
FIG. 13 is a schematic diagram of an example of affine linear weighted intra prediction (ALWIP) as applied to a 4×4 block.
Figure 14:
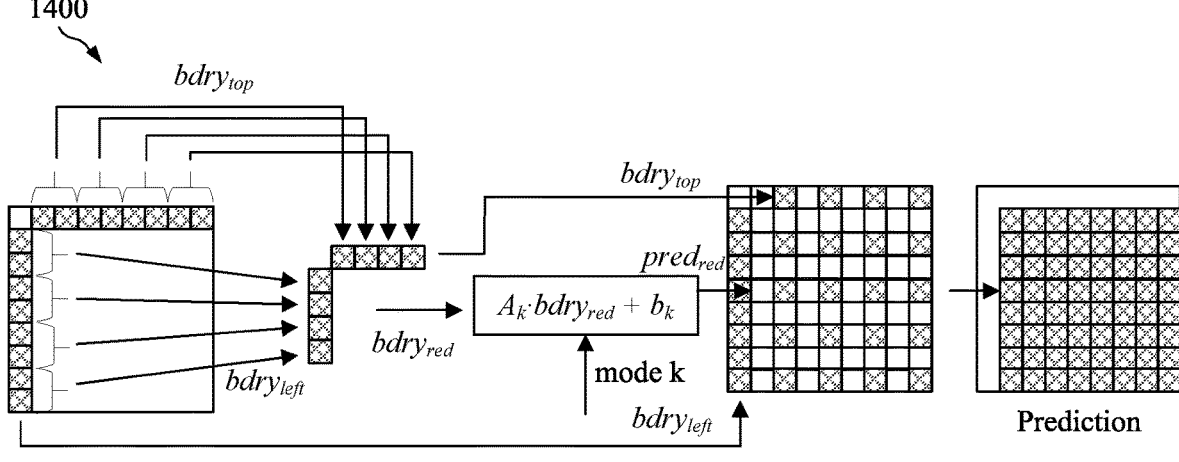
FIG. 14 is a schematic diagram of an example of ALWIP as applied to an 8×8 block.
Figures 15, 16:
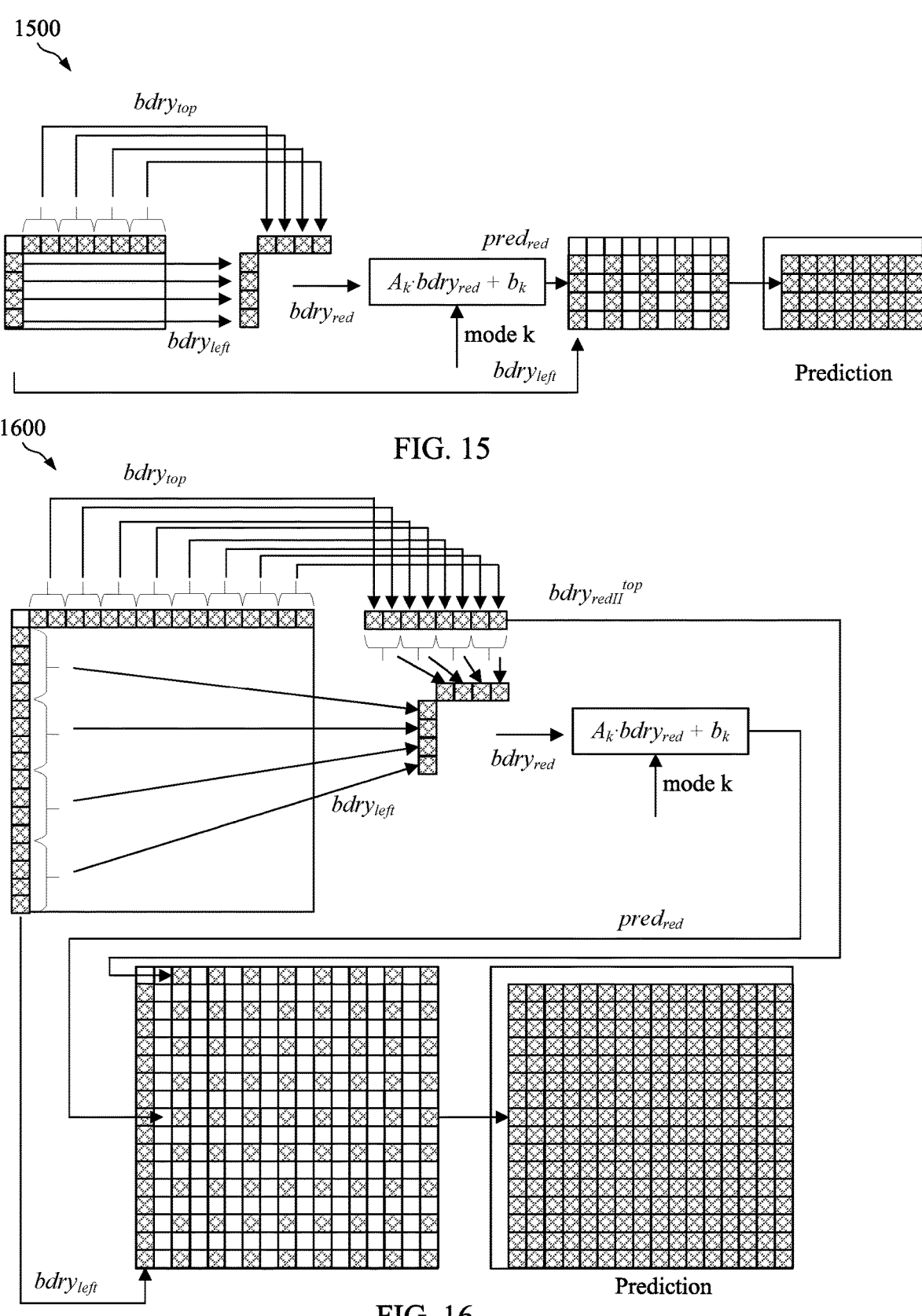
FIG. 15 is a schematic diagram of an example of ALWIP as applied to an 8×4 block.
FIG. 16 is a schematic diagram of an example of ALWIP as applied to an 16×16 block.

An illustration of the entire ALWIP process is now described. FIG. 13 is a schematic diagram 1300 of an example of ALWIP as applied to a 4×4 block. FIG. 14 is a schematic diagram 1400 of an example of ALWIP as applied to an 8×8 block. FIG. 15 is a schematic diagram 1500 of an example of ALWIP as applied to an 8×4 block. FIG. 16 is a schematic diagram 1600 of an example of ALWIP as applied to an 16×16 block. The entire process of averaging, matrix vector multiplication and linear interpolation is illustrated for different shapes in schematic diagrams 1300-1600. Any other shapes are treated in a similar manner to at least one of the depicted cases.

When employing a 4×4 block, as shown in schematic diagram 1300, ALWIP takes two averages along each axis of the boundary of the block, denoted as boundary top ($bdry_{top}$) and boundary left ($bdry_{left}$). The resulting four input samples, denoted as $bdry_{red}$, enter the matrix vector multiplication. The matrices, denoted as $A_k$, are taken from the set $S_0$. After adding an offset, denoted as $b_k$ where k indicates an intra prediction mode and b is an offset associated with k, the matrix vector multiplication is applied the yields the 16 final prediction samples. The matrix vector multiplication is denoted as $A_k \cdot bdry_{red}+b_k$. Linear interpolation is not necessary for generating the prediction signal in this example. Thus, a total of $(4 \cdot 16)/(4 \cdot 4)=4$ multiplications per sample are performed to obtain the prediction.

When employing an 8×8 block, as shown in schematic diagram 1400, ALWIP takes four averages along each axis of the boundary to obtain $bdry_{top}$ and $bdry_{left}$. The resulting eight input samples, denoted as $bdry_{red}$, enter the matrix vector multiplication, denoted as $A_k \cdot bdry_{red}+b_k$. The matrices are taken from the set $S_1$. This yields 16 samples on the odd positions of the prediction block. Thus, a total of $(8 \cdot 16)/(8 \cdot 8)=2$ multiplications per sample are performed. After adding the offset $b_k$, these samples are interpolated vertically by using the reduced top boundary. Horizontal interpolation follows by using the original left boundary. The output of the interpolation results in the prediction.

When employing an 8×4 block, as shown in schematic diagram 1500, ALWIP takes four averages along the horizontal axis of the boundary and the four original boundary values on the left boundary to obtain $bdry_{top}$ and $bdry_{left}$, respectively. The resulting eight input samples, denoted as $bdry_{red}$, enter the matrix vector multiplication, denoted as $A_k \cdot bdry_{red} + b_k$. The matrices are taken from the set $S_1$. This yields 16 samples on the odd horizontal and each vertical positions of the prediction block. Thus, a total of $(8 \cdot 16)/(8 \cdot 4) = 4$ multiplications per sample are performed. After adding the offset $b_k$, these samples are interpolated horizontally by using the original left boundary. The output of the interpolation results in the prediction. The transposed case (a 4×8 block) is treated in a similar manner.

When employing a 16×16 block, as shown in schematic diagram 1600, ALWIP takes four averages along each axis of the boundary to obtain $bdry_{top}$ and $bdry_{left}$. The resulting eight input samples, denoted as $bdry_{red}$, enter the matrix vector multiplication, denoted as $A_k \cdot bdry_{red} + b_k$. The matrices are taken from the set $S_2$. This yields 64 samples on the odd positions of the prediction block. Thus, a total of $(8 \cdot 64)/(16 \cdot 16) = 2$ multiplications per sample are performed. After adding an offset $b_k$, these samples are interpolated vertically by using eight averages of the top boundary. Horizontal interpolation follows by using the original left boundary. The interpolation process, in this case, does not add any multiplications. Therefore, totally, two multiplications per sample are required to calculate ALWIP prediction.

For larger shapes, the procedure is substantially similar to the cases described above, and the number of multiplications per sample is less than four in each case. For W×8 blocks with W>8, only horizontal interpolation is necessary as the samples are given at the odd horizontal and each vertical position. For W×4 blocks with W>8, let $A_k$ be the matrix that arises by leaving out every row that corresponds to an odd entry along the horizontal axis of the down-sampled block. Thus, the output size is 32 and again, only horizontal interpolation remains to be performed. The transposed cases are treated accordingly.

An adapted most probable mode (MPM)-list derivation for luma and chroma intra-prediction modes is now discussed. The ALWIP-modes are harmonized with the MPM-based coding of the intra-prediction modes as follows. The luma and chroma MPM-list derivation processes for the intra-prediction modes uses fixed tables map_alwip_to_angular$_{idx}$, idx$\in\{0, 1, 2\}$, mapping an ALWIP-mode predmode$_{ALWIP}$ on a given PU to one of the intra-prediction modes as follows:

$$\text{predmode}_{Angular} = \text{map\_alwip\_to\_angular}_{idx(PU)}[\text{predmode}_{ALWIP}].$$

$$\text{predmode}_{Angular} = \text{map\_alwip\_to\_angular}_{idx(PU)}[\text{predmode}_{ALWIP}]$$

For the luma MPM-list derivation, whenever a neighboring luma block is encountered which uses an ALWIP-mode predmode$_{ALWIP}$, this block is treated as if it was using the conventional intra-prediction mode predmode$_{Angular}$. For the chroma MPM-list derivation, whenever the current luma block uses an LWIP-mode, the same mapping is used to translate the ALWIP-mode to a conventional intra prediction mode.

Example syntax and semantics, including coding unit syntax, are as follows.

| | Descriptor |
|---|---|
| coding_unit( x0, y0, cbWidth, cbHeight, treeType ) { | |
| . . . | |
|   if( CuPredMode[ x0 ][ y0 ] = = MODE_INTRA ) { | |
|    if( sps_pcm_enabled_flag && | |
|     cbWidth >= MinIpcmCbSizeY && cbWidth <= MaxIpcmCbSize Y && | |
|     cbHeight >= MinIpcmCbSizeY && cbHeight <= MaxIpcmCbSizeY ) | |
|     pcm_flag[ x0 ][ y0 ] | ae(v) |
|    if( pcm_flag[ x0 ][ y0 ] ) { | |
|     while( !byte_aligned( ) ) | |
|      pcm_alignment_zero_bit | f(1) |
|     pcm_sample( cbWidth, cbHeight, treeType) | |
|    } else { | |
|     if( treeType = = SINGLE_TREE | | treeType = = DUAL_TREE_LUMA ) { | |
|      if( abs( Log2(cbWidth)-Log2(cbHeight)) <= 2) | |
|       intra_lwip_flag[ x0 ][ y0 ] | ae(v) |
|      if( intra_lwip_flag[ x0 ][ y0 ] ) { | |
|       intra_lwip_mpm_flag[ x0 ][ y0 ] | ae(v) |
|      if( intra_lwip_mpm_flag[ x0 ][ y0 ] ) | |
|       intra_lwip_mpm_idx[ x0 ][ y0 ] | ae(v) |
|      else | |
|       intra_lwip_mpm_remainder[ x0 ][ y0 ] | ae(v) |
|     } else { | |
|      if( ( y0 % CtbSizeY ) > 0) | |
|       intra_luma_ref_idx[ x0 ][ y0 ] | ae(v) |
|       if (intra_luma_ref_idx[ x0 ][ y0 ] = = 0 && | |
|        ( cbWidth <= MaxTbSizeY | | cbHeight <= MaxTbSizeY ) && | |
|        ( cbWidth * cbHeight > MinTbSizeY * MinTbSizeY )) | |
|        intra_subpartitions_mode_flag[ x0 ][ y0 ] | ae(v) |
|       if( intra_subpartitions_mode_flag[ x0 ][ y0 ] = = 1 && | |
|        cbWidth <= MaxTbSizeY && cbHeight <= MaxTbSize Y ) | |
|        intra_subpartitions_split_flag[ x0 ][ y0 ] | ae(v) |
|       if( intra_luma_ref_idx[ x0 ][ y0 ] = = 0 && | |
|        intra_subpartitions_mode_flag[ x0 ][ y0 ] = = 0) | |
|        intra_luma_mpm_flag[ x0 ][ y0 ] | ae(v) |
|       if( intra_luma_mpm_flag[ x0 ][ y0 ] ) | |
|        intra_luma_mpm_idx[ x0 ][ y0 ] | ae(v) |
|       else | |
|        intra_luma_mpm_remainder[ x0 ][ y0 ] | ae(v) |
|     } | |
|    } | |

-continued

| | Descriptor |
|---|---|
| if( treeType = = SINGLE_TREE \| \| tree Type = = DUAL_TREE_CHROMA ) | |
| intra_chroma_pred_mode[ x0 ][ y0 ] | ae(v) |
| } | |
| } else if( treeType != DUAL_TREE_CHROMA ) { /* MODE_INTER or MODE_IBC */ | |
| . . . | |
| } | |
| } | |

Quantized residual block differential pulse-code modulation (QR-BDPCM) is now discussed. QR-BDPCM may be employed to code screen contents efficiently.

The prediction directions used in QR-BDPCM can be vertical and horizontal prediction modes. The intra prediction is done on the entire block by sample copying in the prediction direction (horizontal or vertical prediction) similar to intra prediction. The residual is quantized and the delta between the quantized residual and the predictor (horizontal or vertical) quantized value is coded. This can be described by the following. For a block of size M (rows)×N (cols), let $r_{i,j}$, $0 \leq i \leq M-1$, $0 \leq j \leq N-1$ be the prediction residual after performing intra prediction horizontally (copying left neighbor pixel values across the predicted block line by line) or vertically (copying top neighbor lines to each line in the predicted block) using unfiltered samples from the above or left block boundary samples. Let $Q(r_{i,j})$, $0 \leq i \leq M-1$, $0 \leq j \leq N-1$ denote the quantized version of the residual $r_{i,j}$, where residual is the difference between the original block and the predicted block values. Then the differential pulse-code modulation (DPCM) is applied to the quantized residual samples, resulting in modified M×N array $\tilde{R}$ with elements $\tilde{r}_{i,j}$. When vertical block differential pulse-code modulation (BDPCM) is signalled with residual quantized samples are obtained as follows:

$$\tilde{r}_{i,j} = \begin{cases} Q(r_{i,j}), & i = 0, 0 \leq j \leq (N-1) \\ Q(r_{i,j}) - Q(r_{(i-1),j}), & 1 \leq i \leq (M-1), 0 \leq j \leq (N-1) \end{cases} \quad (2\text{-}7\text{-}1)$$

For horizontal prediction, similar rules apply, and the residual quantized samples are obtained as follows:

$$\tilde{r}_{i,j} = \begin{cases} Q(r_{i,j}), & 0 \leq i \leq (M-1), j = 0 \\ Q(r_{i,j}) - Q(r_{i,(j-1)}), & 0 \leq i \leq (M-1), 1 \leq j \leq (N-1) \end{cases} \quad (2\text{-}7\text{-}2)$$

The residual quantized samples $\tilde{r}_{i,j}$ are included in a bitstream and sent to the decoder. On the decoder side, the above calculations are reversed to produce $Q(r_{i,j})$, $0 \leq i \leq M-1$, $0 \leq j \leq N-1$. For vertical prediction case, the quantized residual is recovered as follows:

$$Q(r_{i,i}) = \sum_{k=0}^{i} \tilde{r}_{k,i}, 0 \leq i \leq (M-1), 0 \leq j \leq (N-1) \quad (2\text{-}7\text{-}3)$$

For the horizontal case, the quantized residual is recovered as follows:

$$Q(r_{i,j}) = \sum_{k=0}^{j} \tilde{r}_{i,k}, 0 \leq i \leq (M-1), 0 \leq j \leq (N-1) \quad (2\text{-}7\text{-}4)$$

The inverse quantized residuals, $Q^{-1}(Q(r_{i,j}))$, are added to the intra block prediction values to produce the reconstructed sample values. The main benefit of this scheme is that the inverse DPCM can be done on the fly during coefficient parsing by adding the predictor as the coefficients are parsed or the process can be performed after parsing. An example of coding unit syntax for QR-BDPCM are shown as follows.

| | Descriptor |
|---|---|
| coding_unit( x0, y0, cbWidth, cbHeight, treeType ) { | |
| if( tile_group_type != I \| \| sps_ibc_enabled_flag ) { | |
| if( treeType != DUAL_TREE_CHROMA ) | |
| cu_skip_flag[ x0 ][ y0 ] | ae(v) |
| if( cu_skip_flag[ x0 ][ y0 ] == 0 && tile_group_type != I) | |
| pred_mode_flag | ae(v) |
| if( ( ( tile_group_type = = I && cu_skip_flag[ x0 ][ y0 ] = = 0 ) \| \| | |
| ( tile_group_type != I && CuPredMode[ x0 ][ y0 ] != MODE_INTRA | |
| ) ) && | |
| sps_ibc_enabled_flag ) | |
| pred_mode_ibc_flag | ae(v) |
| } | |
| if( CuPredMode[ x0 ][ y0 ] = = MODE_INTRA ) { | |
| if( pred_mode_flag = = MODE_INTRA && ( cIdx = = 0 ) && | |
| ( cbWidth <= 32) && ( CbHeight <= 32 )) { | |
| bdpcm_flag[ x0 ][ y0 ] | ae(v) |
| if( bdpcm_flag[ x0 ][ y0 ] ) { | |
| bdpcm_dir_flag[ x0 ][ y0 ] | ae(v) |
| } | |

-continued

| | Descriptor |
|---|---|
| ```
    else {
  if( sps_pcm_enabled_flag &&
    cbWidth >= MinIpcmCbSizeY && cbWidth <= MaxIpcmCbSize Y
&&
    cbHeight >= MinIpcmCbSizeY && cbHeight <= MaxIpcmCbSize Y )
    pcm_flag[ x0 ][ y0 ]
    if( pcm_flag[ x0 ][ y0 ] ) {
      while( !byte_aligned( ) )
        pcm_alignment_zero_bit
      pcm_sample( cbWidth, cbHeight, treeType)
    } else {
      if( treeType = = SINGLE_TREE | | treeType = =
DUAL_TREE_LUMA ) {
        if( ( y0 % CtbSizeY ) > 0 )
          intra_luma_ref_idx[ x0 ][ y0 ]
        if (intra_luma_ref_idx[ x0 ][ y0 ] = = 0 &&
          ( cbWidth <= MaxTbSizeY | | cbHeight <= MaxTbSize Y ) &&
          ( cbWidth * cbHeight > MinTbSizeY * MinTbSize Y ))
          intra_subpartitions_mode_flag[ x0 ][ y0 ]
        if( intra_subpartitions_mode_flag[ x0 ][ y0 ] = = 1 &&
          cbWidth <= MaxTbSizeY && cbHeight <= MaxTbSize Y )
          intra_subpartitions_split_flag[ x0 ][ y0 ]
        if( intra_luma_ref_idx[ x0 ][ y0 ] == 0 &&
          intra_subpartitions_mode_flag[ x0 ][ y0 ] = = 0 )
          intra_luma_mpm_flag[ x0 ][ y0 ]
        if( intra_luma_mpm_flag[ x0 ][ y0 ] )
          intra_luma_mpm_idx[ x0 ][ y0 ]
        else
          intra_luma_mpm_remainder[ x0 ][ y0 ]
      }
    }
    if( treeType = = SINGLE_TREE | | treeType = =
DUAL_TREE_CHROMA )
      intra_chroma_pred_mode[ x0 ][ y0 ]
    }
  } else if( treeType != DUAL_TREE_CHROMA )
  { /* MODE_INTER or MODE_IBC */
. . .
}
``` | ae(v)<br><br><br>f(1)<br><br><br><br><br><br>ae(v)<br><br><br><br>ae(v)<br><br><br>ae(v)<br><br><br>ae(v)<br><br>ae(v)<br><br>ae(v)<br><br><br><br><br>ae(v) |

In an example, bdpcm_flag[x0][y0] equal to 1 specifies that a bdpcm_dir_flag is present in the coding unit including the luma coding block at the location (x0, y0). Further, bdpcm_dir_flag[x0][y0] equal to 0 specifies that the prediction direction to be used in a bdpcm block is horizontal, otherwise it is vertical.

FIG. 17 is a schematic diagram 1700 of an example of wide angle intra prediction (WAIP). WAIP modes for a given mode index are defined by mapping the intra prediction directional mode to the mode with the opposite direction and offset by 1 mode value as shown in diagram 1700. For a given rectangular block, the aspect ratio is used to determine which angular modes are to be replaced by the corresponding wide-angular mode. The last and first WAIP-mode indices and the first and last non-WAIP mode indices are enumerated for each aspect ratio that can occur for non-square intra blocks in VVC. Accordingly, the last WAIP modes for a block, which belong to the sets {14, 12, 10, 6} and {72, 76, 78, 80}, correspond to the counter diagonals of a given rectangular block and have integer slope. Thus, they have similar properties as modes 2 and 66, which determine the range of angular prediction modes in the case of square blocks. For square-shaped blocks in VVC, each pair of predicted samples that are horizontally or vertically adjacent are predicted from a pair of adjacent reference samples. In contrast, WAIP extends the angular range of directional prediction beyond 45 degree. Therefore, for a coding block predicted with a WAIP mode, adjacent predicted samples are predicted from non-adjacent reference samples. To suppress discontinuities caused by this phenomenon, the reference samples for WAIP modes are always smoothed. This smoothing is performed by either enabling reference sample filtering or by selecting a smoothing interpolation filter. The introduction of WAIP modes does not cause any changes in the intra mode coding. Rather, each mode from the range [67, 80] is treated as a corresponding mode in the range [2,14] and each mode in the range [−14, −1] is treated as a corresponding mode in the range [53, 66]. The mapping of a non-WAIP mode to the corresponding WAIP mode is invoked only within the process of intra prediction generation of a block.

Planar intra-prediction in VVC is now discussed. In VVC, a prediction sample value predSamples[x][y] at position (x, y) in a block with dimensions W×H is derived as follows:

$$\text{pred}V[x][y]=((H{-}1{-}y)*p[x][-1]+(y+1)*p[-1][H])<<\log 2(W)$$

$$\text{pred}H[x][y]=((W{-}1{-}x)*p[-1][y]+(x+1)*p[W][-1])<<\log 2(H)$$

$$\text{predSamples}[x][y]=(\text{pred}V[x][y]+\text{pred}H[x][y]+W*H)>>(\log 2(W)+\log 2(H)+1)$$

where position (0, 0) represents the top-left position of the block, and p[x][y] represent a reconstructed sample at position (x, y).

The following are example technical problems solved by disclosed technical solutions. Dyadic dimensions describe a case where the width and height of a block must be in a form a 2N, wherein N is a positive integer. Intra prediction should be modified to adapt to blocks with non-dyadic dimensions.

Figure 18:
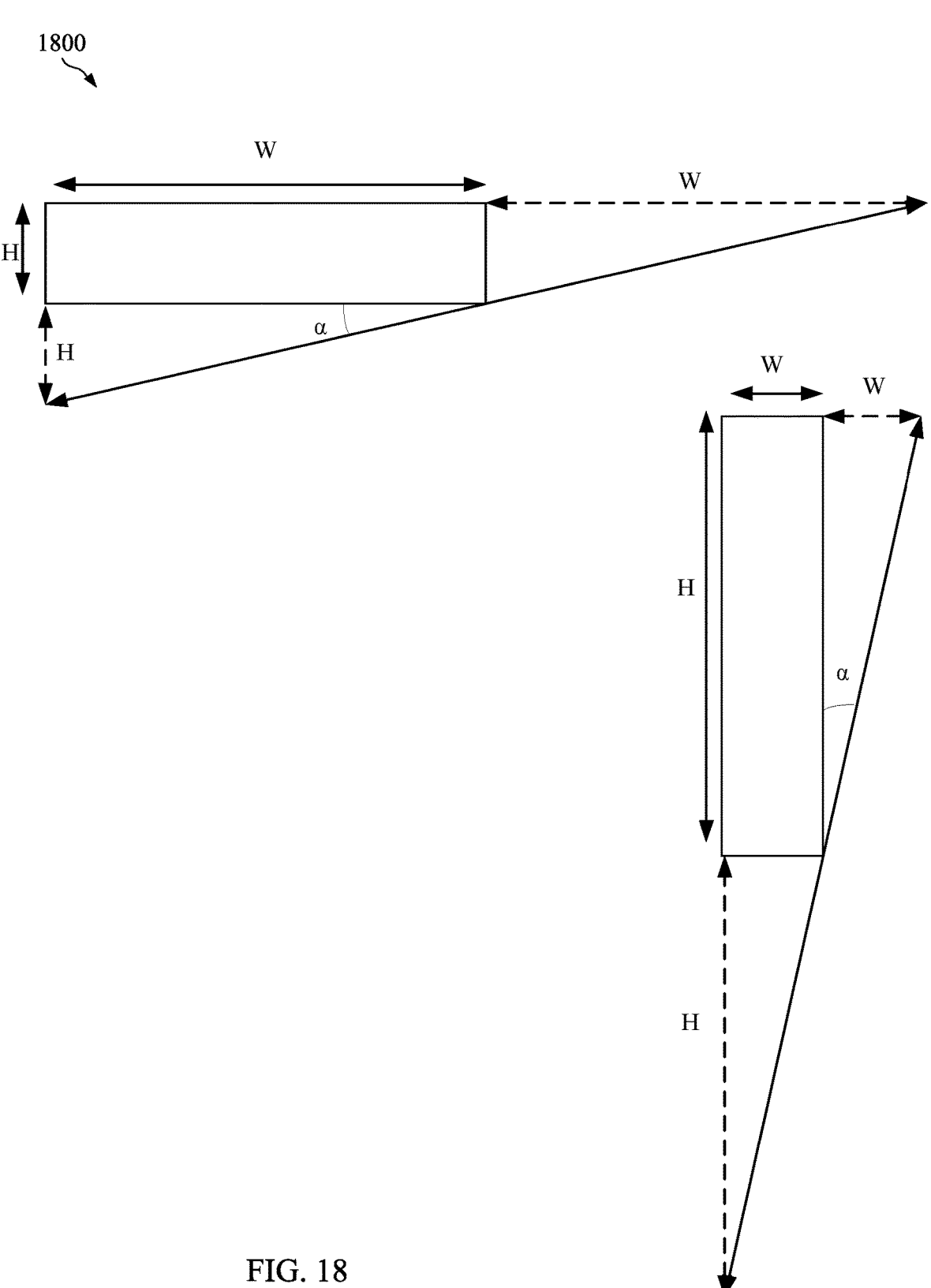
FIG. 18 is a schematic diagram of an example threshold angles used to determine a threshold mode (ThresMode), which can be used when determining a difference between a signaled wide angle intra prediction (sigpredMode) and a final wide angle intra prediction (finalpredMode) when contextual signaling is used for WAIP in non-dyadic blocks.

FIG. 18 is a schematic diagram 1800 of an example threshold angles used to determine a threshold mode (Thres-Mode), which can be used when determining a difference between a signaled wide angle intra prediction (sigpred-Mode) and a final wide angle intra prediction (finalpred-Mode) when contextual signaling is used for WAIP in non-dyadic blocks. For example, an angle α may be used to determine ThresMode. As shown in diagram 1800, the angle α can be determined based on a height (H) and a width (W) of a block. For example, angle α can be determined based on $$\operatorname*{argmin}_{\alpha}\{\tan\alpha \geq H/W\} \text{ or } \operatorname*{argmax}_{\alpha}\{\tan\alpha \leq H/W\},$$

as shown in diagram 1800. Accordingly, sigpredMode for a dyadic block and finalpredMode for a non-dyadic block can be related be a function known to both an encoder and a decoder, and ThresMode can be used to prevent finalpred-Mode from extending past a predetermined angular distance with respect to the current block. In this way, the signaling for WAIP need not be altered for non-dyadic blocks. The encoder can determine the finalpredMode to code the non-dyadic block and signal the corresponding sigpredMode. Further, the decoder can read the sigpredMode and infer the finalpredMode based on the function and the fact that the block is non-dyadic. In effect, this approach alters angular intra prediction modes for non-dyadic blocks and converts the non-dyadic alters angular intra prediction modes into a form that can be signaled for dyadic blocks, and hence signaling for WAIP is not changed.

Disclosed herein are mechanisms to address one or more of the problems listed above. For example, coding tools used for intra prediction may be configured for application to a dyadic block, and hence may not operate correctly when the block is non-dyadic. Accordingly, the disclosed mechanisms disallows and/or alter such coding tools when the block in non-dyadic to allow the functionality to perform correctly when non-dyadic blocks are employed. In a first example, various coding tools are disallowed whenever a dyadic block is employed. Such tools may include multiple reference line (MRL), matrix based intra prediction (MIP), intra sub-partitions (ISP), cross-component linear model (CCLM), CCLM left (LML), CCLM above, (LMA), position dependent intra prediction combination (PDPC), decode-side mode derivation (DIMD), or combinations thereof. In such a case, codewords used to signal such tools may be omitted, and a decoder can infer by the absence of such codewords that the corresponding tools are not used. In other examples, coding tools are altered to operate correctly on non-dyadic blocks. In an example, direct current (DC) prediction is an intra prediction coding tool that averages neighboring samples to generate a prediction value used to code a block. DC prediction can be altered by selecting a dyadic number of above neighboring samples and left neighboring samples instead of selected all neighboring samples. The selected samples may be spatially consecutive, spatially non-consecutive, selected by a step function, etc.

In an example, wide angle intra prediction includes a set of directional prediction modes that point from a current block to a reference sample used to predict the current block. Wide angle intra prediction can be altered by employing contextual signaling based on whether the block is dyadic or non-dyadic. For example, a codeword can indicate a signaled wide angle intra prediction (sigpredMode) used for a dyadic block. However, when the block is non-dyadic, a predetermined algorithm can be used to determine a final wide angle intra prediction (finalpredMode) based on the sigpredMode. For example, finalpredMode may be a function of sigpredMode, block height (H), block width (W), a predetermined integer value, a threshold mode (Thres-Mode), etc. ThresMode may be an angle equal to $$\operatorname*{argmin}_{\alpha}\{\tan\alpha \geq H/W\},$$

an angle equal to $$\operatorname*{argmax}_{\alpha}\{\tan\alpha \leq H/W\},$$

a function of a mode difference (modeDiff), a function of $\lfloor \log_2 W \rfloor$ and $\lfloor \log_2 H \rfloor$, or combinations thereof. In an example, ISP may split a dyadic block into two or four sub-partitions and then perform intra prediction based on the partitions. ISP can be altered for use with non-dyadic blocks, for example by dividing the block into an odd number of sub-partitions, dividing the block into more than four sub-partitions, dividing the block into sub-partitions with different dimensions along a non-dyadic direction, dividing the block into a number of sub-partitions that is a multiple of a predetermine integer value, or combinations thereof. In this way, a non-dyadic block can be correctly partitioned so that the partitions can be used by the intra prediction process. In an example, MIP may average neighboring samples and apply a matrix to the averaged neighboring samples to generate a prediction. MIP can be altered by dividing a non-dyadic block into multiple dyadic blocks, and then the matrix can be applied to each dyadic block. In this way, the functionality of the matrices is preserved and MIP matrices can operate correctly on both dyadic and non-dyadic blocks.

In an example, a padding process can be employed to substitute for unavailable neighboring samples prior to performing intra prediction on a dyadic block. The padding process may be altered by only requiring a dyadic number of left neighboring samples and a dyadic number of above neighboring samples be obtained prior to intra prediction. In this way, the padding process functionality can be preserved for a non-dyadic block. In an example, CCLM may use luma samples to predict chroma samples for use in performing intra prediction on a dyadic block. The CCLM process may be altered by only using a dyadic number of left neighboring samples and a dyadic number of above neighboring samples, instead of all neighboring samples, when CCLM is applied to a non-dyadic block. In this way, the functionality of CCLM is preserved when applied to a non-dyadic block. In an example, planar mode code a block based on prediction sample values at a positions (x, y) (predSamples[x][y]). Planar mode can be altered by employing different equations to derive predSamples[x][y] when a non-dyadic block is employed. In this way, planar mode can select the correct prediction samples in a non-dyadic block to operate correctly.

Accordingly, to address the problems mentioned above, several methods are disclosed to allow intra prediction to operate correctly for non-dyadic blocks. The methods result in achieving better coding performance and/or more accurate results.

The detailed embodiments below should be considered as examples to explain general concepts. These embodiments should not be interpreted in a narrow way. Furthermore, these embodiments can be combined in any manner. In the following discussion, QT, BT, TT, unsymmetric quad tree (UQT), and ETT may refer to QT split, BT split, TT split, UQT split and ETT split, respectively. In the following discussion, a block is a dyadic block if both width and height is a dyadic number, which is in a form of a $2^N$ with N being a positive integer. In the following discussion, a block is a non-dyadic block if at least one of width and height is a non-dyadic number, which cannot be represented in a form of a $2^N$ with N being a positive integer. In the following discussion, split and partitioning have the same meaning.

In an example, W1 and W2 are related to W. In one example, W1 is calculated as $1 << \lfloor \log_2 W \rfloor$ and W2 is calculated as $1 << \lceil \log_2 W \rceil$. In an example, H1 and H2 are related to H. In one example, H1 is calculated as $1 << \lfloor \log_2 H \rfloor$ and H2 is calculated as $1 << \lceil \log_2 H \rceil$. Stated differently, H can be split into H1 and H2 and W can be split into W1 and W2, respectively. Further, for non-dyadic blocks H1 or H2 can be set to a dyadic value. Further, for non-dyadic blocks W1 or W2 can be set to a dyadic value.

Example 1

In one example, whether to apply and/or how to apply a coding tool X for an intra-coded block may depend on whether a block is a dyadic block or a non-dyadic block. In an example, the coding tool X for an intra-coded block may be disabled for a non-dyadic block. The coding tool X may be MRL. The coding tool X may be MIP. The coding tool X may be Intra Sub-Partitions (ISP). The coding tool X may be Cross-Component Linear Model (CCLM). The coding tool X may be CCLM-Left (LML). The coding tool X may be CCLM-Above (LMA). The coding tool X may be Position dependent intra prediction combination (PDPC). The coding tool X may be decode-side intra mode derivation (DIMD). Whether to and/or how to indicate the usage of coding tool X for a block may depend on whether the block is a dyadic block or a non-dyadic block. In one example, the syntax element related to the coding tool X (e.g., indicating the usage of coding tool X) for the block may not be signaled for a non-dyadic block. For example, the syntax element may be inferred to be 0 (e.g., the coding tool X is not used).

Example 2

In one example, a mechanism to derive the DC prediction value (denoted as D) may depend on whether the current block with dimensions W×H is a non-dyadic block. Suppose S(x, y) is the reconstructed sample value for a sample at position (x, y) and the top-left position of the current block is (xCurr, yCurr).

Example 3

In one example, W1 and/or W2 and/or H1 and/or H2 may be used to calculate D.

Example 4

In one example, if the current block is a non-dyadic block, D may be derived using the spatially consecutive multiple samples with total number of samples to be used being dyadic. In one example, the spatially consecutive multiple samples in a selected above row shall start from the same x-coordinate being equal to xCurr. In an example, the spatially consecutive multiple samples in a selected above row may start from the same x-coordinate being greater than to xCurr. In one example, the spatially consecutive multiple samples in a selected left column shall start from the same y-coordinator being equal to yCurr. In one example, the spatially consecutive multiple samples in a selected left column shall start from the same y-coordinator being greater than yCurr.

Example 5

In one example, if the current block is a non-dyadic block, D may be derived using spatially non-consecutive multiple samples with the total number of samples used being dyadic. In one example, at least two of the samples in a selected above row are not located next to each other. In one example, at least two of the samples in a selected left column are not located next to each other.

Example 6

In one example, if the current block is a non-dyadic block, D may be calculated as $$D = \frac{P + Q + \text{offset}}{N}.$$

In the following examples, W' may be replaced by W, W1, or W2, H' may be replaced by H, H1, or H2. In one example, $$P = \sum_{k=0}^{W'-1} S(k + xCurr, yCurr - RefLy),$$

$$Q = \sum_{k=0}^{H'-1} S(xCurr - RefLx, yCurr + k),$$

and N=W'+H'. Offset is an integer such as 0 or N/2. RefLx and RefLy represent the reference line, starting from 1. For example, RefLx=1 (indicating the left adjacent column) or 2, and RefLy=1 (indicating the above adjacent row) or 2. In one example, $$P = 0, Q = \sum_{k=0}^{H'-1} S(xCurr - RefLx, yCurr + k) \text{ and } N = H'$$

if neighbouring samples above to the current block are unavailable. In one example, $$P = \sum_{k=0}^{W'-1} S(k + xCurr, yCurr - RefLy), Q = 0, \text{ and } N = W'$$

if neighbouring samples left of the current block are unavailable. In one example, N must be a dyadic number. In one example, if W is a dyadic number and H is a non-dyadic number, $$P = \sum_{k=0}^{W-1} S(k + xCurr, yCurr - RefLy), Q = 0, \text{ and } N = W.$$

33

34

In one example, if H is a dyadic number and W is a non-dyadic number, $$P = 0, Q = \sum_{k=0}^{H-1} S(xCurr - RefLx, yCurr + k), \text{ and } N = H.$$

In one example, if both W and H are non-dyadic numbers, W' is set to be W1 or W2, and H' is set to be H1 or H2 in previous examples. In one example, if W'>=H' (or W'>H'), set $$P = \sum_{k=0}^{W'-1} S(k + xCurr, yCurr - RefLy), Q = 0, \text{ and } N = W'.$$

In one example, if H'>=W' (or H'>W'), set P=0, $$Q = \sum_{k=0}^{H'-1} S(xCurr - RefLx, yCurr + k), \text{ and } N = H'.$$

In one example, the reconstructed samples used to derive DC may be generated by sample padding or sample substitution.

Example 7

In one example, if the current block is a non-dyadic block, selected samples may be used to calculate D. In one example, if W is a non-dyadic number, S(k×F+xCurr+xOff, yCurr−RefLy) may be used to calculate D, wherein F is a step size such as 2 or 4 and k is an index for the samples to be used. xOff is an offset in the x direction. For example, xOff=0, W/2−1, W/2, W/2+1, or W−1. RefLy represents the reference line. For example, RefLy=1 or 2. In one example, the number of valid k, denoted as N1, should be a dyadic number. k is from 0 to N1-1. For example, N1=W2/F. For example, F=W−1, and k is from 0 to 1. In one example, if H is a non-dyadic number, S(xCurr−RefLx, k×F+yCurr+yOff) may be used to calculate D, wherein F is a step size such as 2 or 4 and k is an index for the samples to be used. yOff is an offset in the x direction. For example, yOff=0, H/2−1, H/2, H/2+1, or H−1. RefLx represents the reference line. For example, RefLx=1 or 2. In one example, the number of valid k, denoted as N2, should be a dyadic number. k is from 0 to N2-1. For example, N2=H2/F. For example, F=H−1, and k is from 0 to 1. In one example, D may be calculated as $$D = \frac{P + Q + \text{offset}}{N}.$$

In one example, $$P = \sum_{k=0}^{N1-1} S(k \times F + xCurr + xOff, yCurr - RefLy),$$

$$Q = \sum_{k=0}^{N2-1} S(xCurr - RefLx, k \times F + yCurr + yOff),$$

and N=N1+N2. Offset is an integer such as 0 or N/2. In one example, $$P = \sum_{k=0}^{N1-1} S(k \times F + xCurr + xOff, yCurr - RefLy), Q = 0, \text{ and } N = N1.$$

Offset is an integer such as 0 or N/2. In one example, $$P = 0, Q = \sum_{k=0}^{N2-1} S(xCurr - RefLx, k \times F + yCurr + yOff), \text{ and } N = N2.$$

Offset is an integer such as 0 or N/2.

In one example, W' may be replaced by W, W1, or W2 and H' may be replaced by H, H1, or H2 when deriving DC prediction. In one example, whether to replace W' by W, W1, or W2 may depend on whether W is a dyadic number or not. For example, W' is replaced by W when W is a dyadic number. For example, W' is replaced by W1 or W2 when W is a non-dyadic number. In one example, whether to replace H' by H, H1, or H2 may depend on whether H is a dyadic number or not. For example, H' is replaced by H when H is a dyadic number. For example, H' is replaced by H1 or H2 when H is a non-dyadic number. If W'>H' (or W'>=H'), $$P = \sum_{k=0}^{N1-1} S(k \times F + xCurr + xOff, yCurr - RefLy),$$

Q=0, and N=N1. Offset is an integer such as 0 or N/2. In one example, N1=W', F=1, xOff=0. If H'>W' (or H'>=W'), P=0, $$Q = \sum_{k=0}^{N2-1} S(xCurr - RefLx, k \times F + yCurr + yOff), \text{ and } N = N2.$$

Offset is an integer such as 0 or N/2. In one example, N2=H', F=1, and yOff=0. In one example, if W' is equal to H', $$P = \sum_{k=0}^{N1-1} S(k \times Fx + xCurr + xOff, yCurr - RefLy),$$

$$Q = \sum_{k=0}^{N2-1} S(xCurr - RefLx, k \times Fy + yCurr + yOff),$$

and N=N1+N2. Offset is an integer such as 0 or N/2. In one example, N1=N2=W'=H', Fx=Fy=1, and xOff=yOff=0. If N1>N2 (or N1>=N2), $$P = \sum_{k=0}^{N1-1} S(k \times F + xCurr + xOff, yCurr - RefLy),$$

Q=0, and N=N1. Offset is an integer such as 0 or N/2. If N2>N1 (or N2>=N1), $$P = 0, Q = \sum_{k=0}^{N2-1} S(xCurr - RefLx, k \times F + yCurr + yOff),$$

and N=N2. Offset is an integer such as 0 or N/2.

Example 8

In one example, if both left and above neighboring samples are available, N1 above neighboring samples and N2 left neighboring samples are used to derive the DC prediction value. N1 should be equal to N2, and both N1 and N2 should be dyadic numbers. In one example, when deriving the DC prediction value, padding may be applied to neighbouring rows/columns (adjacent or non-adjacent), and the padded (or substituted) samples may be utilized.

Example 9

In an example, a wide angle intra-prediction is used and an intra-prediction mode should be adjusted depending on whether the current block is a dyadic block or a non-dyadic block.

Example 10

In one example, an intra-prediction mode (denoted as finalPredMode) used to generate the intra-prediction is derived based on a signaled intra-prediction mode (denoted as SigpredMode) if the current block is a non-dyadic block with dimensions W×H. In one example, finalPredMode=SigpredMode in condition A. For example, condition A is that W is equal to H. In one example, W/H, H/W, or any form of the function input with W and H is calculated and used to derive finalPredMode. For example, r=W>H?(L×W/H). (L×H/W) is calculated and used to derive finalPredMode, wherein L is an integer such as 32. In one example, r may be stored and retrieved in a table. The indices of the table may depend on W and/or H.

In one example, finalPredMode=SigpredMode+M in condition B, wherein M is an integer such as 65. For example, condition B is that W>H and SigpredMode<ThresMode. In one example, ThresMode corresponds to an angle equal $$\text{to } \operatorname*{argmin}_{\alpha}\{\tan\alpha \geq H/W\}$$

as shown in diagram 1800. In one example, ThresMode corresponds to an angle equal to $$\operatorname*{argmax}_{\alpha}\{\tan\alpha \leq H/W\}$$

as shown in diagram 1800. In one example, ThresMode=M1+modeDiff. In one example, M1=2. In one example, modeDiff is derived as the largest integer that satisfies AngT[midAng+modeDiff]<=r, wherein AngT is a table. For example, AngT[ ]={0, 1, 2, 3, 4, 6, 8, 10, 12, 14, 16, 18, 20, 23, 26, 29, 32, 35, 39, 45, 51, 57, 64, 73, 86, 102, 128, 171, 256, 341, 512, 1024}. For example, midAng=17. In one example, modeDiff is derived as the largest integer that satisfies AngT[midAng+modeDiff]×H<=L×W, wherein AngT is a table. For example, AngT[ ]={0, 1, 2, 3, 4, 6, 8, 10, 12, 14, 16, 18, 20, 23, 26, 29, 32, 35, 39, 45, 51, 57, 64, 73, 86, 102, 128, 171, 256, 341, 512, 1024}. In an example, L=32. In one example, ThresMode may be calculated based on $\lfloor\log_2 W\rfloor$ and $\lfloor\log_2 H\rfloor$. In one example, ThresMode=M1+ T[l⌊log₂ W⌋–⌊log₂ H⌋l], wherein T is an table. For example, T={0, 6, 10, 12, 14, 15}. In one example, M1=2. In one example, ThresMode may be calculated based on $\lceil\log_2 W\rceil$ and $\lceil\log_2 H\rceil$. In one example, ThresMode=M1+T[l⌈log₂ W⌉–⌈log₂ H⌉l], wherein T is an table. For example, T={0, 6, 10, 12, 14, 15}. In one example, M1=2. In one example, ThresMode may be derived base on a table. The table may be indexed by W and/or H. The table may be indexed by $\lfloor\log_2 W\rfloor$ and/or $\lfloor\log_2 H\rfloor$. The table may be indexed by $\lceil\log_2 W\rceil$ and $\lceil\log_2 H\rceil$.

In one example, finalPredMode=SigpredMode–M in condition C, wherein M is an integer such as 65. For example, condition C is that W<H and SigpredMode>ThresMode. In one example, ThresMode corresponds to an angle equal to $$\operatorname*{argmin}_{\alpha}\{\tan\alpha \geq W/H\}$$

as shown in diagram 1800. In one example, ThresMode corresponds to an angle equal to $$\operatorname*{argmax}_{\alpha}\{\tan\alpha \leq W/H\}$$

as shown m diagram 1800. In one example, ThresMode=M2–modeDiff. In one example, M2=66. In one example, modeDiff is derived as the largest integer that satisfies AngT[midAng+modeDiff]<=r, wherein AngT is a table. For example, AngT[ ]={0, 1, 2, 3, 4, 6, 8, 10, 12, 14, 16, 18, 20, 23, 26, 29, 32, 35, 39, 45, 51, 57, 64, 73, 86, 102, 128, 171, 256, 341, 512, 1024}. For example, midAng=17. In one example, modeDiff is derived as the largest integer that satisfies AngT[midAng+modeDiff]×W<=L×H, wherein AngT is a table. For example, AngT[ ]={0, 1, 2, 3, 4, 6, 8, 10, 12, 14, 16, 18, 20, 23, 26, 29, 32, 35, 39, 45, 51, 57, 64, 73, 86, 102, 128, 171, 256, 341, 512, 1024}. For example, L=32. In one example, ThresMode may be calculated based on $\lfloor\log_2 W\rfloor$ and $\lfloor\log_2 H\rfloor$. In one example, ThresMode=M2– T[l⌊log₂ W⌋–⌊log₂ H⌋l], wherein T is an table. For example, T={0, 6, 10, 12, 14, 15}. In one example, M2=66. In one example, ThresMode may be calculated based on $\lceil\log_2 W\rceil$ and $\lceil\log_2 H\rceil$. In one example, ThresMode=M2–T[l⌈log₂ W⌉–⌈log₂ H⌉l], wherein T is an table. For example, T={0, 6, 10, 12, 14, 15}. In one example, M2=66. In one example, ThresMode may be derived base on a table. The table may be indexed by W and/or H. The table may be indexed by $\lfloor\log_2 W\rfloor$ and/or $\lfloor\log_2 H\rfloor$. The table may be indexed by $\lceil\log_2 W\rceil$ and $\lceil\log_2 H\rceil$. In one example, finalPredMode=SigpredMode by default (no condition is satisfied).

Example 11

In an example, intra sub-partitions prediction, such as ISP, may be adjusted depending on whether the current block is a dyadic block or a non-dyadic block. In one example, the intra sub-partitions prediction may divide a non-dyadic block into an odd number of sub-partitions (e.g., 3 sub-partitions instead of 2 or 4 sub-partitions). In one example, the intra sub-partitions prediction may divide a non-dyadic block into more than T (such as T=4) sub-partitions. In one example, the intra sub-partitions prediction may divide a non-dyadic block into multiple sub-partitions but the resultant sub-partition may have different dimensions along the non-dyadic direction. In one example, the dimension size of a sub-partition resulting from the intra sub-partitions may be required to be equal to a number which is always multiple of X (such as X=4). In one example, a mechanism to divide a non-dyadic block may be signaled in the bitstream. In one example, a mechanism to divide a non-dyadic block may be inferred by a pre-defined rule.

Example 12

In one example, matrix based intra prediction, such as MIP, may be adjusted depending on whether the current block is a dyadic block or a non-dyadic block. For example, a non-dyadic block may be divided into more than one dyadic sub-block and the matrices applied to the sub-blocks based on intra prediction. For example, the matrix based intra prediction may be applied sequentially (one after another) among all the sub-blocks. For example, the matrix based intra prediction for a second dyadic sub-block may make use of the reconstructed samples of the first dyadic sub-block, which are inside the current coding unit/block. For example, the matrix based intra prediction for all dyadic sub-blocks of a coding unit may be applied in parallel. For example, the matrix based intra prediction for any dyadic sub-block may only use the reconstructed samples outside/neighboring the current coding unit/block. For example, a mechanism to divide a non-dyadic block into dyadic sub-blocks for matrix based intra prediction may be signaled in the bitstream. In an example, MIP may be inferred by a pre-defined rule. For example, additional matrices and/or offset vectors may be designed for a non-dyadic block in case of matrix based intra prediction.

Example 13

In one example, a substitution process, also known as extension, padding, and/or extrapolation, for unavailable neighboring samples, adjacent to or non-adjacent to the current block, used for intra-prediction on the current block with dimensions W×H may depend on whether W and/or H is a dyadic number or not. In one example, the length of samples (denoted as H') left of the current block that are required in the intra-prediction process may depend on whether W and/or H is a dyadic number or not. Some or all of the H' samples may be obtained by the substitution process. In one example, H'=max(H1, H2) if W and/or His a non-dyadic number. In an example, H'=max(H1, H2) if H is a non-dyadic number. For example, H1=2×H, and H2=W+H. In one example, the length of samples (denoted as W') above to the current block that are required in the intra-prediction process may depend on whether W and/or H is a dyadic number or not. Some or all of the W' samples may be obtained by the substitution process. In one example, W'=max(W1, W2) if W and/or H is a non-dyadic number. For example, W'=max(W1, W2) if W is a non-dyadic number. For example, W1=2×W, and W2=W+H.

Example 14

In an example, the neighboring samples, adjacent to or non-adjacent to the current block, for a CCLM mode on the current block with dimensions W×H may depend on whether W and/or H is a dyadic number or not. The CCLM mode may be CCLM, CCLM-left, CCLM-above or any other CCLM modes such as Multi-Model CCLM. In one example, the length of samples (denoted as H') left of the current block that are used in CCLM may depend on whether W and/or H is a dyadic number or not. Some or all of the H' samples may be obtained by the substitution process. In one example, H'=max(H1, H2) if W and/or H is a non-dyadic number. In an example, H'=max(H1, H2) if H is a non-dyadic number. In an example, H1=2×H, and H2=W+H. In one example, the length of samples (denoted as W') above to the current block that are used in CCLM may depend on whether W and/or H is a dyadic number or not. Some or all of the W' samples may be obtained by the substitution process. In one example, W'=max(W1, W2) if W and/or His a non-dyadic number. For example, W'=max(W1, W2) if W is a non-dyadic number. For example, W1=2×W, W2=W+H.

Example 15

In one example, a mechanism to conduct planar intra-prediction mode on a block with dimensions W×H may depend on whether W and/or H is a dyadic number or not. In one example, if both W and H are dyadic numbers, planar intra-prediction mode is conducted with a first mechanism. The first mechanism may be according to VVC, wherein no division operation is applied. In one example, if at least one of W and H is a non-dyadic number, planar intra-prediction mode is conducted according to a second mechanism. In the second mechanism, at least one division operation is used. In one example, the divisor may be based on W×H. For example, the divisor is equal to W×H×2. In the second mechanism, a prediction sample value predSamples[x][y] at position (x, y) is derived as below:

$$predV[x][y]=((H-1-y)*p[x][-1]+(y+1)*p[-1][H])*W$$

$$predH[x][y]=((W-1-x)*p[-1][y]+(x+1)*p[W][-1])*H$$

$$predSamples[x][y]=(predV[x][y]+predH[x][y]+W*H)/(W*H*2).$$

In the second mechanism, a prediction sample value predSamples[x][y] at position (x, y) is derived as below:

$$predV[x][y]=((H-1-y)*p[x][-1]+(y+1)*p[-1][H]+H/2)/H$$

$$predH[x][y]=((W-1-x)*p[-1][y]+(x+1)*p[W][-1]+W/2)/W$$

$$predSamples[x][y]=(predV[x][y]+predH[x][y]+1)>>1.$$

In the second mechanism, a prediction sample value predSamples[x][y] at position (x, y) is derived as below, if H is a non-dyadic number, but W is a dyadic number:

$$predV[x][y]=((H-1-y)*p[x][-1]+(y+1)*p[-1][H]+H/2)/H$$

$$predH[x][y]=((W-1-x)*p[-1][y]+(x+1)*p[W][-1]+W/2)>>\log 2(W)$$

$$predSamples[x][y]=(predV[x][y]+predH[x][y]+1)>>1.$$

In the second mechanism, a prediction sample value predSamples[x][y] at position (x, y) is derived as below, if H is a dyadic number, but W is a non-dyadic number:

$$predV[x][y]=((H-1-y)*p[x][-1]+(y+1)*p[-1][H]+H/2)>>\log 2(H)$$

$$predH[x][y]=((W-1-x)*p[-1][y]+(x+1)*p[W][-1]+W/2)/W$$

$$predSamples[x][y]=(predV[x][y]+predH[x][y]+1)>>1.$$

In one example, at least one lookup table is used to replace the division operation if division is used to conduct planar intra mode if at least one of W and H is a non-dyadic number. In an example of the second mechanism, no division operation is used. In one example, a prediction sample value predSamples[x][y] at position (x, y) is derived as below:

$$predV[x][y]=(((1<<\lfloor Log\,2(H)\rfloor)-1-y)*p[x][-1]+(y+1)*p[-1][H])<<\lfloor Log\,2(W)\rfloor$$

$$predH[x][y]=(((1<<\lfloor Log\,2(W)\rfloor)-1-x)*p[-1][y]+(x+1)*p[W][-1])<<\lfloor Log\,2(H)\rfloor$$

$$predSamples[x][y]=(predV[x][y]+predH[x][y]+(1<<\lfloor Log\,2(W)\rfloor)*((<<\lfloor Log\,2(H)\rfloor))>>(\lfloor Log\,2(W)\rfloor+\lfloor Log\,2(H)\rfloor+1)$$

In one example, a prediction sample value predSamples [x][y] at position (x, y) is derived as below:

$$\text{pred}V[x][y]=(((1<<\lceil\text{Log }2(H)\rceil)-1-y)*p[x][-1]+(y+1)$$
$$*p[-1][H])<<\lceil\text{Log }2(W)\rceil$$

$$\text{pred}H[x][y]=(((1<<\lceil\text{Log }2(W)\rceil)-1-x)*p[-1][y]+(x+1)$$
$$*p[W][-1])<<\lceil\text{Log }2(H)\rceil$$

$$\text{predSamples}[x][y]=(\text{pred}V[x][y]+\text{pred}H[x][y]+$$
$$(1<<\lceil\text{Log }2(W)\rceil)*(((1<<\lceil\text{Log }2(H)\rceil)>>(\lceil\text{Log }$$
$$2(W)\rceil+\lceil\text{Log }2(H)\rceil+1)$$

In an example, the first mechanism and the second mechanism may be the same.

Figure 19:
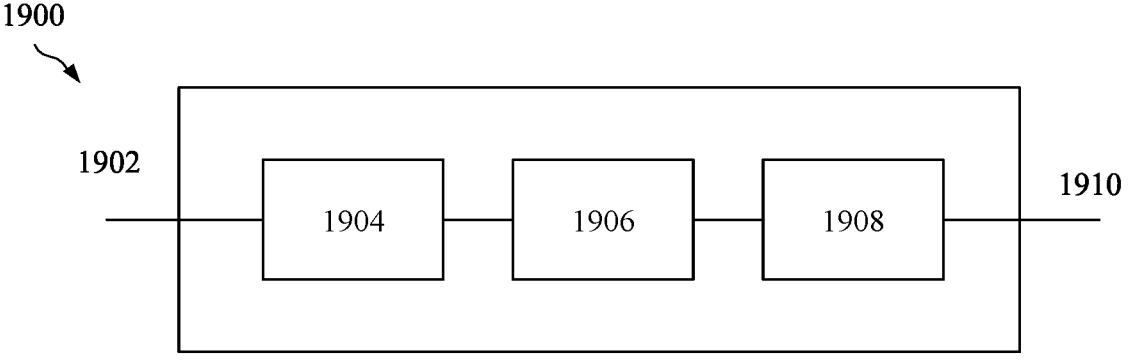
FIG. 19 is a block diagram showing an example video processing system.

FIG. 19 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multicomponent pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by a component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 20:
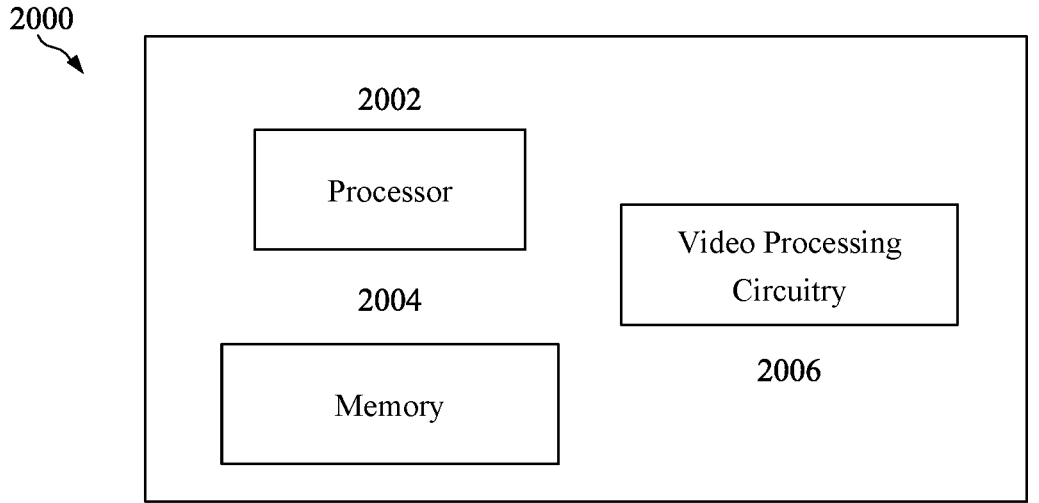
FIG. 20 is a block diagram of an example video process-ing apparatus.

FIG. 20 is a block diagram of an example video processing apparatus 2000. The apparatus 2000 may be used to implement one or more of the methods described herein. The apparatus 2000 may be embodied in a smartphone, tablet, computer, Internet of Things (IoT) receiver, and so on. The apparatus 2000 may include one or more processors 2002, one or more memories 2004 and video processing circuitry 2006. The processor(s) 2002 may be configured to implement one or more methods described in the present document. The memory (memories) 2004 may be used for storing data and code used for implementing the methods and techniques described herein. The video processing circuitry 2006 may be used to implement, in hardware circuitry, some techniques described in the present document. In some embodiments, the video processing circuitry 2006 may be at least partly included in the processor 2002, e.g., a graphics co-processor.

FIG. 21 is a flowchart for an example method 2100 of video processing implemented by a video coding apparatus. The method 2100 includes determining whether a block is dyadic or non-dyadic at step 2102. At step 2104, the method enables a coding tool associated with intra prediction when the block is determined to be dyadic. At step 2106, the method disables the coding tool when the block is determined to be non-dyadic. At step 2108, a conversion is performed between a visual media data and a bitstream by applying intra prediction to the block. In an example, the conversion may include encoding the visual media data into a bitstream at an encoder. In another example, the conversion may include decoding the visual media data from a bitstream at a decoder.

In an example, the coding tool disabled in step 2106 is multiple reference line (MRL), matrix based intra prediction (MIP), intra sub-partitions (ISP), cross-component linear model (CCLM), CCLM left (LML), CCLM above, (LMA), position dependent intra prediction combination (PDPC), decode-side mode derivation (DIMD), or combinations thereof. Further, whether to and/or how to indicate the usage of the coding tool for a block may depend on whether the block is a dyadic block or a non-dyadic block. For example, a syntax element associated with the coding tool can be included in the bitstream at step 2108 when the block is determined to be dyadic, but the syntax element associated with the coding tool is not included in the bitstream when the block is determined to be non-dyadic. The decoder can then infer that the coding tool is not used due to the lack of the syntax element in the bitstream.

In an example, the block has a width (W) and a height (H). Further, the block is coded according to a DC prediction value determined based on a reduced width (W1) or a reduced height (H1) when the block is determined to be non-dyadic, where W1 is less than W and H1 is less than H. For example, W can be partitioned into W1 and W2, and/or H can be partitioned into H1 and H2. In an example, W1 and/or H1 can be dyadic and W2 and/or H2 can be any remainder that render the block non-dyadic. DC prediction can then be performed based on the dyadic values represented by W1 and/or H1. As such, the block can be coded according to a DC prediction value determined based on a dyadic number of neighboring samples when the block is determined to be non-dyadic. Further, the block in non-dyadic and hence has a non-dyadic number of neighboring samples, and the selected dyadic number of neighboring samples is less than the non-dyadic number of neighboring samples. The selected dyadic number of neighboring samples may be spatially consecutive, spatially non-consecutive, selected based on a step size function, etc. For example, any two of the selected neighboring samples may not be adjacent. In an example, a first of the spatially consecutive neighboring samples is positioned at a top left corner of the block. In another example, a first of the spatially consecutive neighboring samples is not positioned at a top left corner of the block. In a specific example, the block is coded according to the following when the block is determined to be non-dyadic:

$$D = \frac{P + Q + \text{offset}}{N},$$

$$P = \sum_{k=0}^{W'-1} S(k + xCurr, \, yCurr - RefLy),$$

$$Q = \sum_{k=0}^{H'-1} S(xCurr - RefLx, \, yCurr + k),$$

and $N = W' + H'$ where D a DC prediction value, offset is an integer value, S indicates a sample value at a corresponding location, k is a sample index, xCurr is a horizontal coordinate of a top left sample of the block, yCurr is a vertical coordinate of a top left sample of the block, RefLy indicates a reference line row, RefLx indicates a reference line column, W' is a width associated with the block, and H' is a height associated with the block, wherein H' is a dyadic height smaller than H or W' is a dyadic width smaller than W. N may be required to be dyadic in some examples. It should be noted that P or Q can be set to zero when above neighboring samples or left neighboring samples, respectively, are unavailable. Further, these equations can be modified in different embodiments as described in the examples listed above. In an example, the block can be coded according to a DC prediction value determined based on a dyadic number of above neighboring samples and a dyadic number of left neighboring samples when the block is determined to be non-dyadic.

In an example, WAIP is adjusted for non-dyadic blocks. For example, the codewords for WAIP may be contextual such that certain codewords have different values of dyadic blocks and non-dyadic blocks. In an example, the codeword can indicate a signaled wide angle intra prediction (sigpredMode) when the block is dyadic, and the same codeword can indicate a final wide angle intra prediction (finalpredMode) when the block is non-dyadic. sigpredMode may equal finalpredMode when W equals H. In an example, the finalpredMode is a function of sigpredMode, a W of the block, and a H of the block. For example, r=W>H?(L×W/H):(L×H/W) can be to derive finalPredMode, where L is an integer such as 32 and r indicates finalpredMode. A correspondence between finalpredMode and sigpredMode may also be stored in a table. In another example, finalpredMode is equal to sigpredMode plus an integer value when W is greater than H and sigpredMode is less than a threshold mode (ThresMode). In another example, finalpredMode is equal to sigpredMode plus an integer value when W is greater than H and sigpredMode is greater than a threshold mode (ThresMode). ThresMode may be an angle as indicated in diagram 1800. In an example, ThresMode is an angle equal to $$\underset{\alpha}{\arg\min}\{\tan\alpha \geq H/W\},$$

an angle equal to $$\underset{\alpha}{\arg\max}\{\tan\alpha \leq H/W\},$$

a function of a mode difference (modeDiff), a function of $\lfloor \log_2 W \rfloor$ and $\lfloor \log_2 H \rfloor$, a function of $\lceil \log_2 W \rceil$ and $\lceil \log_2 H \rceil$, or combinations thereof. ThresMode may also be stored in a table, and the coding device can obtain ThresMode form the table. The table may be indexed by W, H, and/or corresponding log values.

In an example, the block is coded according to ISP. When the block is non-dyadic, the block is divided into an odd number of sub-partitions, divided into more than four sub-partitions, divided into sub-partitions with different dimensions along a non-dyadic direction, divided into a number of sub-partitions that is a multiple of a predetermine integer value, or combinations thereof. Such partitions can be signaled in the bitstream or inferred based on a rule.

In an example, when the block is non-dyadic, the block is coded according to MIP by dividing the non-dyadic block into a plurality of dyadic sub-blocks prior to application of a matrix. The matrices may be applied in series and/or in parallel, depending on the example. Such usage may be signaled and/or inferred based on a rule.

In an example, the block is coded according to substitution of unavailable neighboring samples, also known as padding, by obtaining a dyadic number of left neighboring samples when a H of the block is non-dyadic and obtaining a dyadic number of above neighboring samples when a W of the block is non-dyadic. This results in selecting a dyadic number of neighboring samples even though a larger non-dyadic number of neighboring sample positions are adjacent to the block. For example, the padding process may obtain a length of samples (denoted as H') where H'=max(H1, H2). As another example, the padding process may obtain a length of samples (denoted as W') where W'=max(W1, W2).

In an example, when the block is non-dyadic, the block is coded according to CCLM by obtaining a dyadic number of left neighboring samples when a H of the block is non-dyadic and obtaining a dyadic number of above neighboring samples when a W of the block is non-dyadic. This results in selecting a dyadic number of neighboring samples even though a larger non-dyadic number of neighboring sample positions are adjacent to the block. For example, the padding process may obtain a length of samples (denoted as H') where H'=max(H1, H2). As another example, the padding process may obtain a length of samples (denoted as W') where W'=max(W1, W2).

In an example, the block is coded according to a planar intra prediction mode value determined according to a division operation with a divisor based on a W of the block and a H of the block when the block is determined to be non-dyadic. For example, when the block is determined to be non-dyadic, the block can be coded according to prediction sample values at a positions (x, y) (predSamples[x][y]) derived according to:

$$predV[x][y]=((H-1-y)*p[x][-1]+(y+1)*p[-1][H])*W,$$

$$predH[x][y]=((W-1-x)*p[-1][y]+(x+1)*p[W][-1])*H,$$
and $$predSamples[x][y]=(predV[x][y]+predH[x][y]+W*H)/(W*H*2),$$

where H is a height of the block, W is a width of the block, (x, y) are sample coordinates, and p[ ][ ] indicates neighboring samples at a corresponding coordinate.

In another example, when the block is determined to be non-dyadic, the block is coded according to prediction sample values at a positions (x, y) (predSamples[x][y]) derived according to:

$$predV[x][y]=((H-1-y)*p[x][-1]+(y+1)*p[-1][H]+H/2)/H,$$

$$predH[x][y]=((W-1-x)*p[-1][y]+(x+1)*p[W][-1]+W/2)/W, \text{ and}$$

$$predSamples[x][y]=(predV[x][y]+predH[x][y]+1)>>1,$$

where H is a height of the block, W is a width of the block, (x, y) are sample coordinates, >> is a right shift operator, and p[ ][ ] indicates neighboring samples at a corresponding coordinate.

In another example, when the block is determined to be non-dyadic, the block is coded according to prediction sample values at a positions (x, y) (predSamples[x][y]) derived according to:

$$predV[x][y]=((H-1-y)*p[x][-1]+(y+1)*p[-1][H]+H/2)/H,$$

$$predH[x][y]=((W-1-x)*p[1][y]+(x+1)*p[W][-1]+W/2)>>\log 2(W), \text{ and}$$

$$predSamples[x][y](predV[x][y]+predH[x][y]+1)>>1,$$

where H is a height of the block, W is a width of the block, (x, y) are sample coordinates, >> is a right shift operator, log 2 is a logarithmic function, and p[ ][ ] indicates neighboring samples at a corresponding coordinate.

In another example, when the block is determined to be non-dyadic, the block is coded according to prediction sample values at a positions (x, y) (predSamples[x][y]) derived according to:

$$predV[x][y]=((H-1-y)*p[x][-1]+(y+1)*p[1][H]+H/2)>>\log 2(H),$$

$$predH[x][y]=((W-1-x)*p[-1][y]+(x+1)*p[W][-1]+W/2)/W, \text{ and}$$

$$predSamples[x][y](predV[x][y]+predH[x][y]+1)>>1,$$

where H is a height of the block, W is a width of the block, (x, y) are sample coordinates, >> is a right shift operator, log 2 is a logarithmic function, and p[ ][ ] indicates neighboring samples at a corresponding coordinate.

In another example, when the block is determined to be non-dyadic, the block is coded according to prediction sample values at a positions (x, y) (predSamples[x][y]) derived according to:

$$predV[x][y]=(((1<<\lfloor Log\ 2(H)\rfloor)-1-y)*p[x][-1]+(y+1)*p[-1][H])<<\lfloor Log\ 2(W)\rfloor,$$

$$predH[x][y]=(((1<<\lfloor Log\ 2(W)\rfloor)-1-x)*p[-1][y]+(x+1)*p[W][-1])<<\lfloor Log\ 2(H)\rfloor, \text{ and}$$

$$predSamples[x][y]=(predV[x][y]+predH[x][y]+(1<<\lfloor Log\ 2(W)\rfloor)*((1<<\lfloor Log\ 2(H)\rfloor))>>(\lfloor Log\ 2(W)\rfloor+\lfloor Log\ 2(H)\rfloor+1),$$

where H is a height of the block, W is a width of the block, (x, y) are sample coordinates, >> is a right shift operator, << is a left shift operators, log 2 is a logarithmic function, p[ ][ ] indicates neighboring samples at a corresponding coordinate, and ⌊ ⌋ is a floor function.

In another example, when the block is determined to be non-dyadic, the block is coded according to prediction sample values at a positions (x, y) (predSamples[x][y]) derived according to:

$$predV[x][y]=(((1<<\lceil Log\ 2(H)\rceil)-1-y)*p[x][-1]+(y+1)*p[-1][H])<<\lceil Log\ 2(W)\rceil,$$

$$predH[x][y]=(((1<<\lceil Log\ 2(W)\rceil)-1-x)*p[-1][y]+(x+1)*p[W][-1])<<\lceil Log\ 2(H)\rceil, \text{ and}$$

$$predSamples[x][y]=(predV[x][y]+predH[x][y]+(1<<\lceil Log\ 2(W)\rceil)*((1<<\lceil Log\ 2(H)\rceil)>>(\lceil Log\ 2(W)\rceil+\lceil Log\ 2(H)\rceil+1),$$

where H is a height of the block, W is a width of the block, (x, y) are sample coordinates, >> is a right shift operator, << is a left shift operators, log 2 is a logarithmic function, p[ ][ ] indicates neighboring samples at a corresponding coordinate, and ⌈ ⌉ is a ceiling function.

It should be noted that the method 2100 can be implemented in an apparatus for processing video data comprising a processor and a non-transitory memory with instructions thereon, such as video encoder 2300, video decoder 2400, and/or encoder 2500. In such a case, the instructions upon execution by the processor, cause the processor to perform the method 2100. Further, the method 2100 can be performed by a non-transitory computer readable medium comprising a computer program product for use by a video coding device. The computer program product comprises computer executable instructions stored on the non-transitory computer readable medium such that when executed by a processor cause the video coding device to perform the method 2100.

Figure 22:
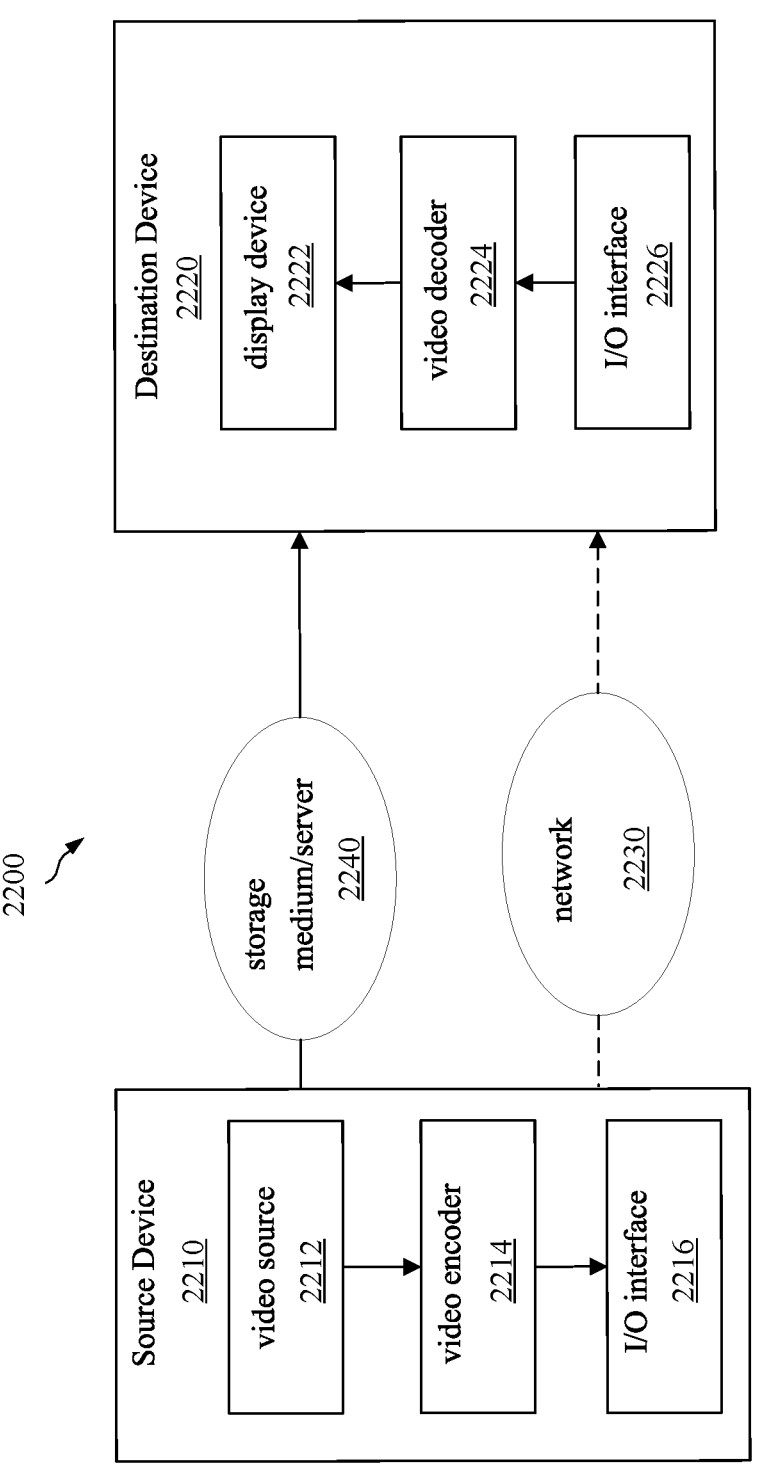
FIG. 22 is a block diagram that illustrates an example video coding system.

FIG. 22 is a block diagram that illustrates an example video coding system 2200 that may utilize the techniques of this disclosure. As shown in FIG. 22, video coding system 2200 may include a source device 2210 and a destination device 2220. Source device 2210 generates encoded video data which may be referred to as a video encoding device. Destination device 2220 may decode the encoded video data generated by source device 2210 which may be referred to as a video decoding device.

Source device 2210 may include a video source 2212, a video encoder 2214, and an input/output (I/O) interface 2216. Video source 2212 may include a source such as a video capture device, an interface to receive video data from a video content provider, and/or a computer graphics system for generating video data, or a combination of such sources. The video data may comprise one or more pictures. Video encoder 2214 encodes the video data from video source 2212 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 2216 may include a modulator/demodulator (modem) and/or a transmitter. The encoded video data may be transmitted directly to destination device 2220 via I/O interface 2216 through network 2230. The encoded video data may also be stored onto a storage medium/server 2240 for access by destination device 2220.

Destination device 2220 may include an I/O interface 2226, a video decoder 2224, and a display device 2222. I/O interface 2226 may include a receiver and/or a modem. I/O interface 2226 may acquire encoded video data from the source device 2210 or the storage medium/server 2240. Video decoder 2224 may decode the encoded video data. Display device 2222 may display the decoded video data to a user. Display device 2222 may be integrated with the destination device 2220, or may be external to destination device 2220, which can be configured to interface with an external display device.

Video encoder 2214 and video decoder 2224 may operate according to a video compression standard, such as the High Efficiency Video Coding (HEVC) standard, Versatile Video Coding (VVM) standard and other current and/or further standards.

Figure 23:
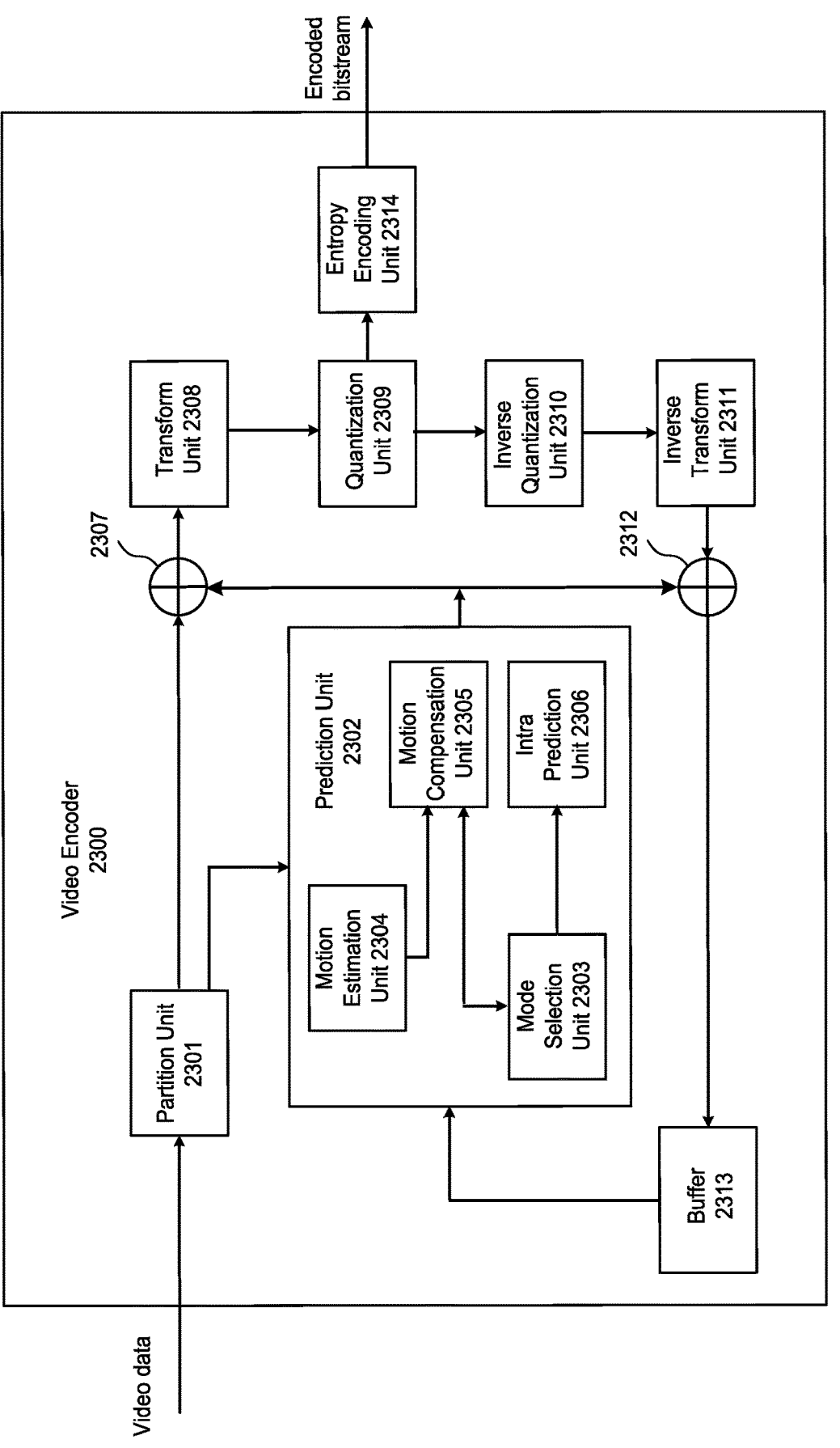
FIG. 23 is a block diagram that illustrates an example encoder.

FIG. 23 is a block diagram illustrating an example of video encoder 2300, which may be video encoder 2214 in the system 2200 illustrated in FIG. 22. Video encoder 2300 may be configured to perform any or all of the techniques of this disclosure. In the example of FIG. 23, video encoder 2300 includes a plurality of functional components. The techniques described in this disclosure may be shared among the various components of video encoder 2300. In some examples, a processor may be configured to perform any or all of the techniques described in this disclosure.

The functional components of video encoder 2300 may include a partition unit 2301, a prediction unit 2302 which may include a mode selection unit 2303, a motion estimation unit 2304, a motion compensation unit 2305, an intra prediction unit 2306, a residual generation unit 2307, a transform processing unit 2308, a quantization unit 2309, an inverse quantization unit 2310, an inverse transform unit 2311, a reconstruction unit 2312, a buffer 2313, and an entropy encoding unit 2314.

In other examples, video encoder 2300 may include more, fewer, or different functional components. In an example, prediction unit 2302 may include an intra block copy (IBC) unit. The IBC unit may perform prediction in an MC mode in which at least one reference picture is a picture where the current video block is located.

Furthermore, some components, such as motion estimation unit 2304 and motion compensation unit 2305 may be highly integrated, but are represented in the example of FIG. 23 separately for purposes of explanation.

Partition unit 2301 may partition a picture into one or more video blocks. Video encoder 2300 and video decoder 2400 may support various video block sizes.

Mode selection unit 2303 may select one of the coding modes, intra or inter, e.g., based on error results, and provide the resulting intra or inter coded block to a residual generation unit 2307 to generate residual block data and to a reconstruction unit 2312 to reconstruct the encoded block for use as a reference picture. In some examples, mode selection unit 2303 may select a combination of intra and inter prediction (CIIP) mode in which the prediction is based on an inter prediction signal and an intra prediction signal. Mode selection unit 2303 may also select a resolution for a motion vector (e.g., a sub-pixel or integer pixel precision) for the block in the case of inter prediction.

To perform inter prediction on a current video block, motion estimation unit 2304 may generate motion information for the current video block by comparing one or more reference frames from buffer 2313 to the current video block. Motion compensation unit 2305 may determine a predicted video block for the current video block based on the motion information and decoded samples of pictures from buffer 2313 other than the picture associated with the current video block.

Motion estimation unit 2304 and motion compensation unit 2305 may perform different operations for a current video block, for example, depending on whether the current video block is in an I slice, a P slice, or a B slice.

In some examples, motion estimation unit 2304 may perform uni-directional prediction for the current video block, and motion estimation unit 2304 may search reference pictures of list 0 or list 1 for a reference video block for the current video block. Motion estimation unit 2304 may then generate a reference index that indicates the reference picture in list 0 or list 1 that contains the reference video block and a motion vector that indicates a spatial displacement between the current video block and the reference video block. Motion estimation unit 2304 may output the reference index, a prediction direction indicator, and the motion vector as the motion information of the current video block. Motion compensation unit 2305 may generate the predicted video block of the current block based on the reference video block indicated by the motion information of the current video block.

In other examples, motion estimation unit 2304 may perform bi-directional prediction for the current video block, motion estimation unit 2304 may search the reference pictures in list 0 for a reference video block for the current video block and may also search the reference pictures in list 1 for another reference video block for the current video block. Motion estimation unit 2304 may then generate reference indexes that indicate the reference pictures in list 0 and list 1 containing the reference video blocks and motion vectors that indicate spatial displacements between the reference video blocks and the current video block. Motion estimation unit 2304 may output the reference indexes and the motion vectors of the current video block as the motion information of the current video block. Motion compensation unit 2305 may generate the predicted video block of the current video block based on the reference video blocks indicated by the motion information of the current video block.

In some examples, motion estimation unit 2304 may output a full set of motion information for decoding processing of a decoder. In some examples, motion estimation unit 2304 may not output a full set of motion information for the current video. Rather, motion estimation unit 2304 may signal the motion information of the current video block with reference to the motion information of another video block. For example, motion estimation unit 2304 may determine that the motion information of the current video block is sufficiently similar to the motion information of a neighboring video block.

In one example, motion estimation unit 2304 may indicate, in a syntax structure associated with the current video block, a value that indicates to the video decoder 2400 that the current video block has the same motion information as another video block.

In another example, motion estimation unit 2304 may identify, in a syntax structure associated with the current video block, another video block and a motion vector difference (MVD). The motion vector difference indicates a difference between the motion vector of the current video block and the motion vector of the indicated video block. The video decoder 2400 may use the motion vector of the indicated video block and the motion vector difference to determine the motion vector of the current video block.

As discussed above, video encoder 2300 may predictively signal the motion vector. Two examples of predictive signaling techniques that may be implemented by video encoder 2300 include advanced motion vector prediction (AMVP) and merge mode signaling.

Intra prediction unit 2306 may perform intra prediction on the current video block. When intra prediction unit 2306 performs intra prediction on the current video block, intra prediction unit 2306 may generate prediction data for the current video block based on decoded samples of other video blocks in the same picture. The prediction data for the current video block may include a predicted video block and various syntax elements.

Residual generation unit 2307 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 2307 may not perform the subtracting operation.

Transform processing unit 2308 may generate one or more transform coefficient video blocks for the current video block by applying one or more transforms to a residual video block associated with the current video block.

After transform processing unit 2308 generates a transform coefficient video block associated with the current video block, quantization unit 2309 may quantize the transform coefficient video block associated with the current video block based on one or more quantization parameter (QP) values associated with the current video block.

Inverse quantization unit 2310 and inverse transform unit 2311 may apply inverse quantization and inverse transforms to the transform coefficient video block, respectively, to reconstruct a residual video block from the transform coefficient video block. Reconstruction unit 2312 may add the reconstructed residual video block to corresponding samples from one or more predicted video blocks generated by the prediction unit 2302 to produce a reconstructed video block associated with the current block for storage in the buffer 2313.

After reconstruction unit 2312 reconstructs the video block, the loop filtering operation may be performed to reduce video blocking artifacts in the video block.

Entropy encoding unit 2314 may receive data from other functional components of the video encoder 2300. When entropy encoding unit 2314 receives the data, entropy encoding unit 2314 may perform one or more entropy encoding operations to generate entropy encoded data and output a bitstream that includes the entropy encoded data.

Figure 24:
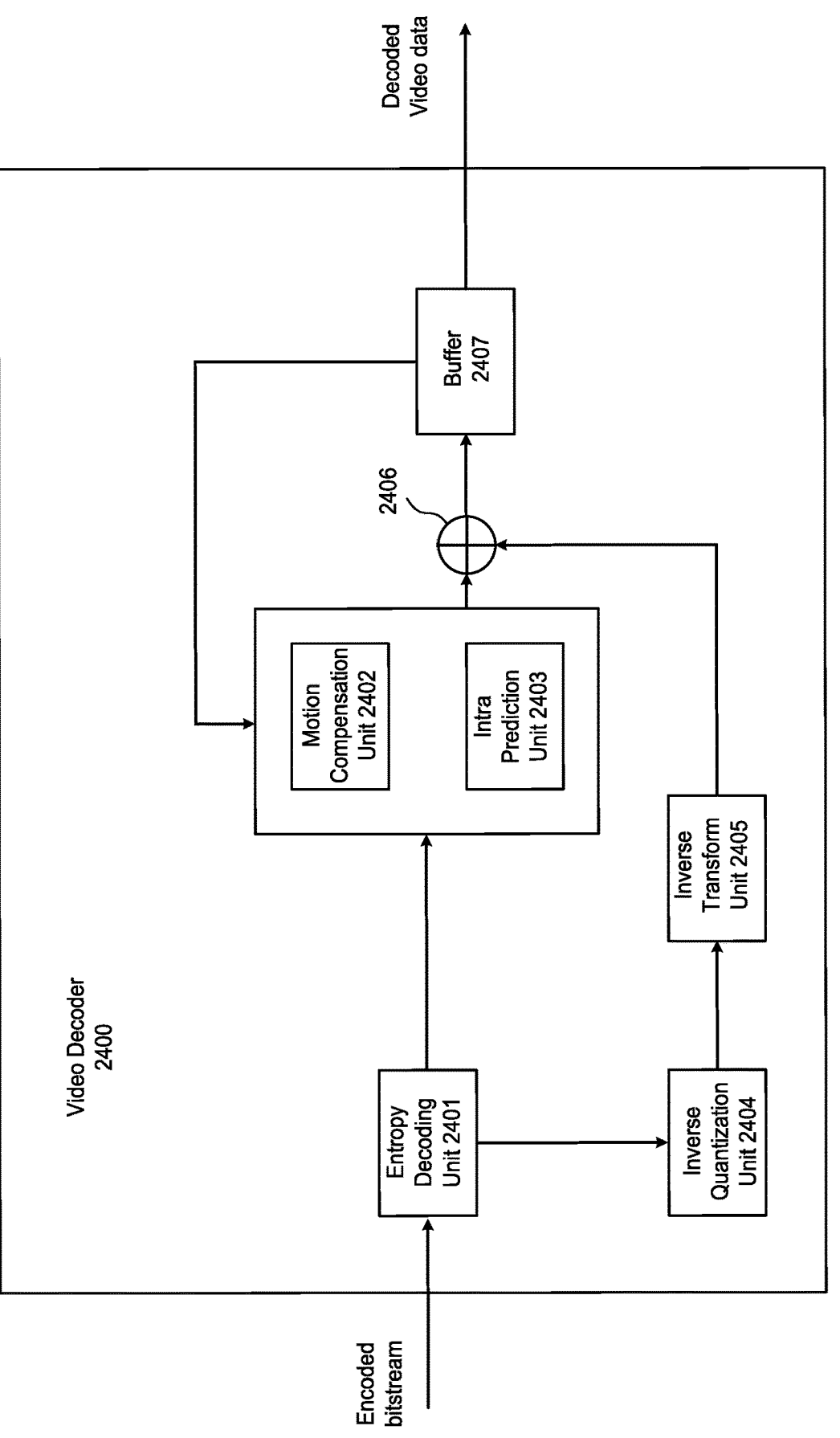
FIG. 24 is a block diagram that illustrates an example decoder.

FIG. 24 is a block diagram illustrating an example of video decoder 2400 which may be video decoder 2224 in the system 2200 illustrated in FIG. 22.

The video decoder 2400 may be configured to perform any or all of the techniques of this disclosure. In the example of FIG. 24, the video decoder 2400 includes a plurality of functional components. The techniques described in this disclosure may be shared among the various components of the video decoder 2400. In some examples, a processor may be configured to perform any or all of the techniques described in this disclosure.

In the example of FIG. 24, video decoder 2400 includes an entropy decoding unit 2401, a motion compensation unit 2402, an intra prediction unit 2403, an inverse quantization unit 2404, an inverse transformation unit 2405, a reconstruction unit 2406, and a buffer 2407. Video decoder 2400 may, in some examples, perform a decoding pass generally reciprocal to the encoding pass described with respect to video encoder 2300 (FIG. 23).

Entropy decoding unit 2401 may retrieve an encoded bitstream. The encoded bitstream may include entropy coded video data (e.g., encoded blocks of video data). Entropy decoding unit 2401 may decode the entropy coded video data, and from the entropy decoded video data, motion compensation unit 2402 may determine motion information including motion vectors, motion vector precision, reference picture list indexes, and other motion information. Motion compensation unit 2402 may, for example, determine such information by performing the AMVP and merge mode.

Motion compensation unit 2402 may produce motion compensated blocks, possibly performing interpolation based on interpolation filters. Identifiers for interpolation filters to be used with sub-pixel precision may be included in the syntax elements.

Motion compensation unit 2402 may use interpolation filters as used by video encoder 2300 during encoding of the video block to calculate interpolated values for sub-integer pixels of a reference block. Motion compensation unit 2402 may determine the interpolation filters used by video encoder 2300 according to received syntax information and use the interpolation filters to produce predictive blocks.

Motion compensation unit 2402 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 2403 may use intra prediction modes for example received in the bitstream to form a prediction block from spatially adjacent blocks. Inverse quantization unit 2404 inverse quantizes, i.e., de-quantizes, the quantized video block coefficients provided in the bitstream and decoded by entropy decoding unit 2401. Inverse transform unit 2405 applies an inverse transform.

Reconstruction unit 2406 may sum the residual blocks with the corresponding prediction blocks generated by motion compensation unit 2402 or intra prediction unit 2403 to form decoded blocks. If desired, a deblocking filter may also be applied to filter the decoded blocks in order to remove blockiness artifacts. The decoded video blocks are then stored in buffer 2407, which provides reference blocks for subsequent motion compensation/intra prediction and also produces decoded video for presentation on a display device.

Figure 25:
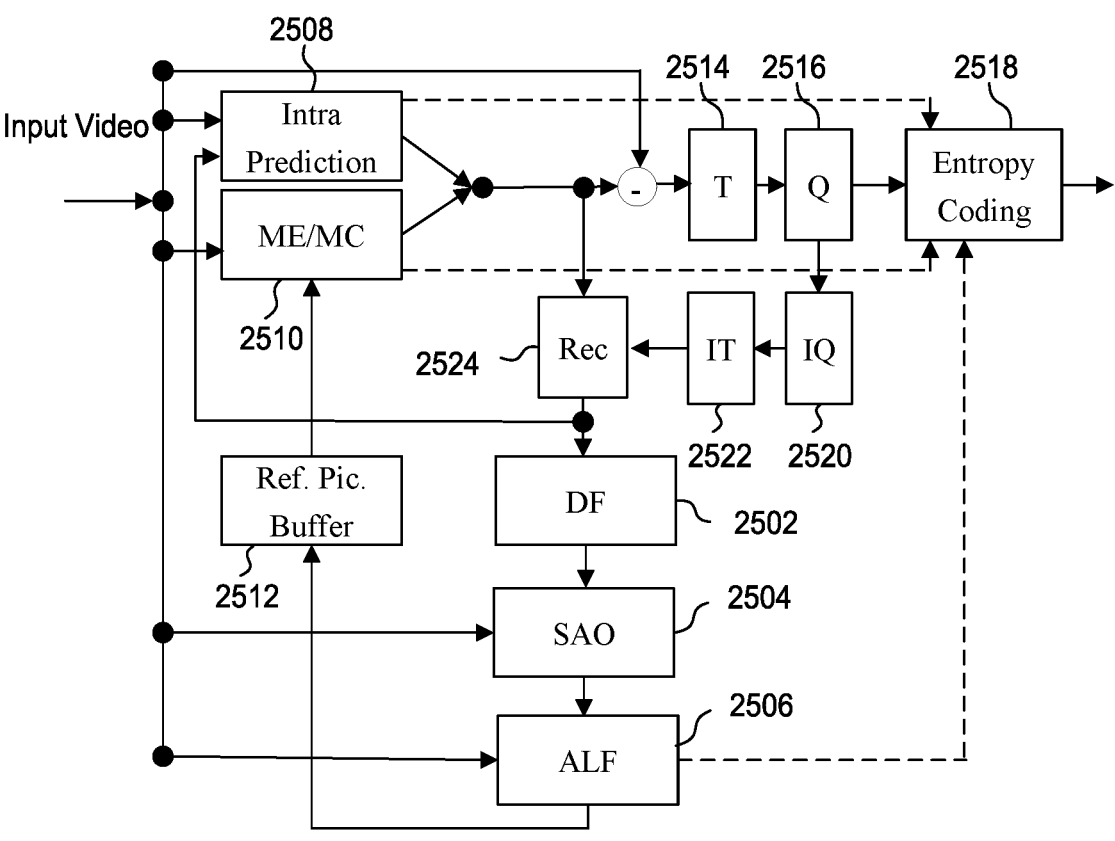
FIG. 25 is a schematic diagram of an example encoder.

FIG. 25 is a schematic diagram of an example encoder 2500. The encoder 2500 is suitable for implementing the techniques of VVC. The encoder 2500 includes three in-loop filters, namely a deblocking filter (DF) 2502, a sample adaptive offset (SAO) 2504, and an adaptive loop filter (ALF) 2506. Unlike the DF 2502, which uses predefined filters, the SAO 2504 and the ALF 2506 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 2506 is located at the last processing stage of each picture and can be regarded as a tool trying to catch and fix artifacts created by the previous stages.

The encoder 2500 further includes an intra prediction component 2508 and a motion estimation/compensation (ME/MC) component 2510 configured to receive input video. The intra prediction component 2508 is configured to perform intra prediction, while the ME/MC component 2510 is configured to utilize reference pictures obtained from a reference picture buffer 2512 to perform inter prediction. Residual blocks from inter prediction or intra prediction are fed into a transform (T) component 2514 and a quantization (Q) component 2516 to generate quantized residual transform coefficients, which are fed into an entropy coding component 2518. The entropy coding component 2518 entropy codes the prediction results and the quantized transform coefficients and transmits the same toward a video decoder (not shown). Quantization components output from the quantization component 2516 may be fed into an inverse quantization (IQ) components 2520, an inverse transform component 2522, and a reconstruction (REC) component 2524. The REC component 2524 is able to output images to the DF 2502, the SAO 2504, and the ALF 2506 for filtering prior to those images being stored in the reference picture buffer 2512.

A listing of solutions preferred by some examples is provided next.

The following solutions show examples of techniques discussed herein.

1. A video processing method (e.g., method 2100 depicted in FIG. 21), comprising: determining, for a conversion between a video block of a video and a bitstream of the video, whether or how an intra coding tool is used for the conversion based on whether the video block is dyadic according to a rule; and performing the conversion based on the determining.

2. The method of solution 1, wherein the rule specifies that the intra coding tool is disables responsive to the block being non-dyadic.

3. The method of any of solutions 1-2, wherein the intra coding tool includes a multiple reference line too or a matrix based intra prediction or an intra sub-partition tool or a cross-component linear model, a position dependent intra prediction combination tool or decoder-side intra mode derivation tool.

4. A video processing method, comprising: determining, for a conversion between a video block of a video and a bitstream of the video, a manner of prediction of direct current (DC) value, called D, of the video block having W×H dimension based on whether the video block is dyadic according to a rule; and performing the conversion based on the determining.

5. The method of solution 4, wherein the rule specifies that W1 or H1 are used to determine D, where W1 is a function of W and H1 is a function of H.

6. The method of solution 4, wherein the rule specifies that responsive to the video block being non-dyadic, D is determined using N number of spatially consecutive samples, where N is dyadic.

7. The method of solution 4, wherein the rule specifies that responsive to the video block being non-dyadic, D is determined using N number of spatially consecutive samples, where N is non-dyadic 8. A video processing method, comprising: determining, for a conversion between a video block of a video and a bitstream of the video, a parameter of a wide angle intra-prediction coding tool based on whether the video block is dyadic according to a rule; and performing the conversion based on the determining.

9. The method of solution 8, wherein the rule specifies that an intra-prediction mode, denoted as finalPredMode, used to generate an intra-prediction of the video block is derived based on a signaled intra-prediction mode, denoted as SigpredMode, that is indicated in the bitstream, responsive to whether the current block is a non-dyadic block with dimensions W×H.

10. The method of solution 9, wherein finalPredMode is equal to SigpredMode.

11. A video processing method, comprising: determining, for a conversion between a video block of a video and a bitstream of the video, whether or how to use an intra sub-partition prediction coding tool for the conversion based on whether the video block is dyadic according to a rule; and performing the conversion based on the determining.

12. The method of solution 11, wherein the rule specifies that, responsive to the video block being non-dyadic, the video block is divided into an odd number of sub-partitions for applying the intra sub-prediction coding tool.

13. The method of solution 11, wherein the rule specifies that, responsive to the video block being non-dyadic, the video block is divided into a number of sub-partitions for applying the intra sub-prediction coding tool, wherein the number is greater than or a threshold T.

14. A video processing method, comprising: determining, for a conversion between a video block of a video and a bitstream of the video, whether or how to use a matrix based intra prediction coding tool for the conversion based on whether the video block is dyadic according to a rule; and performing the conversion based on the determining.

15. The method of solution 14, wherein the rule specifies that, responsive to the video block being non-dyadic, the video block is divided into more than one dyadic sub-blocks for the matrix based intra prediction coding tool.

16. The method of solution 14, wherein the rule specifies that, responsive to the video block being non-dyadic, the video block is divided into more than one dyadic sub-blocks for the matrix based intra prediction coding tool using a partitioning scheme that is signaled in the bitstream.

17. The method of any of above solutions, wherein the rule further defines whether or how unavailable samples of neighboring blocks of the video block are determined during the conversion based on whether the video block is dyadic.

18. The method of solution 17, wherein the rule defines a number of samples to left of the video block based on whether height or width of the video block is dyadic.

19. The method of solution 17, wherein the rule defines a number of samples above the video block based on whether height or width of the video block is dyadic.

20. The method of any of solutions 17-19, wherein the unavailable samples are determined by padding.

21. The method of any of solutions 17-19, wherein the unavailable samples are determined by extrapolation.

22. A video processing method, comprising: determining, for a conversion between a video block of a video and a bitstream of the video, neighboring samples of the video block for a prediction using a cross-component linear model (CCLM) according to a rule; and performing the conversion based on the determining.

23. The method of solution 22, wherein the rule specifies a number of samples H' to left of the video block used for the CCLM depends on whether a height or a width of the video block is dyadic.

24. The method of solution 22, wherein the rule specifies a number of samples W' above the video block used for the CCLM depends on whether a height or a width of the video block is dyadic.

25. The method of any of solutions 22-24, wherein the CCLM comprises a CCLM-left or a CCLM-above or a multi-model CCLM coding tool.

26. A video processing method, comprising: determining, for a conversion between a video block of a video having W×H dimension and a bitstream of the video, whether or how a planar intra-prediction mode is used for the conversion according to a rule based on whether the video block is dyadic; and performing the conversion based on the determining.

27. The method of solution 26, wherein the rule specifies that the planar intra-prediction is performed in a first way responsive to both W and H being dyadic.

28. The method of solution 26, wherein the rule specifies that the planar intra-prediction is performed in a second way responsive to at least W or H being dyadic.

29. The method of solutions 27 or 28, wherein the first way and the second way are same to each other.

30. The method of any of solutions 1-29, wherein the conversion includes generating the bitstream from the video.

31. The method of any of solutions 1-29, wherein the conversion includes generating the video from the bitstream.

32. A method of storing a bitstream on a computer-readable medium, comprising generating a bitstream according to a method recited in any one or more of solutions 1-31 and storing the bitstream on the computer-readable medium.

33. A computer-readable medium having a bitstream of a video stored thereon, the bitstream, when processed by a processor of a video decoder, causing the video decoder to generate the video, wherein the bitstream is generated according to a method recited in one or more of solutions 1-31.

34. A video decoding apparatus comprising a processor configured to implement a method recited in one or more of solutions 1 to 31.

35. A video encoding apparatus comprising a processor configured to implement a method recited in one or more of solutions 1 to 31.

36. A computer program product having computer code stored thereon, the code, when executed by a processor, causes the processor to implement a method recited in any of solutions 1 to 31.

37. A computer readable medium on which a bitstream complying to a bitstream format that is generated according to any of solutions 1 to 31.

38. A method, an apparatus, a bitstream generated according to a disclosed method or a system described in the present document.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of processing video data, comprising:
    performing a conversion between a video block of a video and a bitstream of the video according to a coding rule, wherein a dimension of the video block is W×H, wherein W is a width of the video block and H is a height of the video block, and
    wherein the coding rule specifies that whether a coding tool is applied for the video block depends on whether the video block is a non-dyadic block, and wherein the video block is a non-dyadic block when at least one of W and H is a non-dyadic number;
    wherein a syntax element for indicating a usage of the coding tool is not included in the bitstream when the video block is the non-dyadic block, and wherein the syntax element is inferred to be 0.

2. The method of claim 1, wherein the coding tool is multiple reference line (MRL) intra prediction, matrix based intra prediction (MIP), intra sub-partitions prediction (ISP), cross-component linear model (CCLM), position dependent intra prediction combination (PDPC), or decode-side intra mode derivation (DIMD).

3. The method of claim 1, wherein the video block is coded with a direct current (DC) prediction mode, and wherein the coding rule specifies that a DC prediction value used in the DC prediction mode depends on whether the video block is the non-dyadic block.

4. The method of claim 3, wherein when the video block is the non-dyadic block, the DC prediction value is derived by one of the following:
    the DC prediction value is calculated based on a first width (W1), a second width (W2), a first height (H1), and a second height (H2), where W1 is calculated as $1 << \lfloor \log_2 W \rfloor$, W2 is calculated as $1 << \lceil \log_2 W \rceil$, H1 is calculated as $1 << \lfloor \log_2 H \rfloor$, and H2 is calculated as $1 << \lceil \log_2 H \rceil$, wherein $\lceil \ \rceil$ is a ceiling function, $\lfloor \ \rfloor$ is a floor function, H is a height of the video block, and W is a width of the video block;
    the DC prediction value is determined based on a dyadic number of spatially consecutive neighboring samples;
    the DC prediction value is determined based on a dyadic number of spatially non-consecutive neighboring samples;
    the DC prediction value is determined based on $$D = \frac{P + Q + \text{offset}}{N},$$

-continued $$P = \sum_{k=0}^{W'-1} S(k + xCurr, yCurr - RefLy),$$

$$Q = \sum_{k=0}^{H'-1} S(xCurr - RefLx, yCurr + k),$$

and $N = W' + H'$ where D is the DC prediction value, offset is an integer, RefLx and RefLy represent reference lines, xCurr and yCurr represent a top-left position of the video block, W' is equal to W or W1, H' is equal to H or H1; or the DC prediction value is determined based on selected neighboring samples.

5. The method of claim 1, wherein the coding rule specifies that when the video block is the non-dyadic block, a final intra prediction mode is determined based on a signaled intra prediction mode.

6. The method of claim 5, wherein the final intra prediction mode is determined by one of the following:

the final intra prediction mode is determined as finalPredMode=SigpredMode when W is equal to H, where finalPredMode represents the final intra prediction mode and SigpredMode represents the signaled intra prediction mode;

the final intra prediction mode is determined as finalPredMode=SigpredMode+M when W>H and SigpredMode<ThresMode, where M is an integer, ThresMode is corresponding to an angle calculated based on W and H;

the final intra prediction mode is determined as finalPredMode=SigpredMode−M when W<H and SigpredMode>ThresMode; or the final intra prediction mode is determined as finalPredMode=SigpredMode by default.

7. The method of claim 1, wherein the video block is coded according to intra sub-partitions prediction (ISP), and wherein the coding tool specifies that the video block is divided base on whether the video block is the non-dyadic block.

8. The method of claim 7, wherein when the video block is the non-dyadic block, the video block is divided by one of the following:

the video block is divided into an odd number of sub-partitions;

the video block is divided into more than four sub-partitions;

the video block is divided into sub-partitions with different dimensions along a non-dyadic direction; or the video block is divided into a number of sub-partitions that is a multiple of a predetermined integer value.

9. The method of claim 1, wherein the coding rule specifies that matrix based intra prediction (MIP) is adjusted depending on whether the video block is the non-dyadic block, and wherein when the video block is the non-dyadic block, the video block is divided into a plurality of dyadic sub-blocks prior to an application of a matrix, and information indicating division of the video block into the dyadic sub-blocks is signalled in the bitstream.

10. The method of claim 1, wherein the coding rule specifies that a substitution of unavailable neighboring samples of the video block depends on whether the video block is the non-dyadic block, and wherein when the video block is the non-dyadic block, the substitution of the unavailable neighboring samples is obtained based on a dyadic number of left neighboring samples when H is a non-dyadic number, and the substitution of the unavailable neighboring samples is obtained based on a dyadic number of above neighboring samples when W is a non-dyadic number.

11. The method of claim 1, wherein the coding rule specifies that neighboring samples of the video block used for cross-component linear model (CCLM) depends on whether the video block is the non-dyadic block.

12. The method of claim 11, wherein when the video block is the non-dyadic block, a length of neighboring samples left to the video block that are required in the CCLM is determined as H'=max(H1, H2), and a length of neighboring samples above to the video block that are required in the CCLM is determined as W'=max(W1, W2), where H' represents the length of neighboring samples left to the video block, W' represents the length of neighboring samples above to the video block, H1=2×H, H2=W+H, W1=2×W, W2=W+H, and wherein W is video block width and H is video block height.

13. The method of claim 1, wherein the coding rule specifies that a Planar intra prediction mode is applied based on whether the video block is the non-dyadic block, and wherein when both video block width (W) and video block height (H) are dyadic numbers, the Planar intra-prediction mode is conducted with no division operation is applied, and when at least one of W and H is the non-dyadic number, the Planar intra-prediction mode is conducted with at least one division operation is applied.

14. The method of claim 13, wherein when at least one of W and H is the non-dyadic number, the video block is coded according to prediction sample values at a position (x, y) (predSamples[x][y]) derived according to:

predV[x][y]=((H−1−y)*p[x][−1]+(y+1)*p[−1][H])*W, predH[x][y]=((W−1−x)*p[−1][y]+(x+1)*p[W][−1])*H, and predSamples[x][y]=(predV[x][y]+predH[x][y]+W*H)/ (W*H*2), where (x, y) are sample coordinates, and p[ ][ ] indicates neighboring samples at a corresponding coordinate.

15. The method of claim 13, wherein when at least one of W and H is the non-dyadic number, the video block is coded according to prediction sample values at a position (x, y) (predSamples[x][y]) derived according to:

predV[x][y]=((H−1−y)*p[x][−1]+(y+1)*p[−1][H]+H/ 2)/H, predH[x][y]=((W−1−x)*p[1][y]+(x+1)*p[W][−1]+W/ 2)/W, and predSamples[x][y]=(predV[x][y]+predH[x][y]+1)>>1, where (x, y) are sample coordinates, >> is a right shift operator, and p[ ][ ] indicates neighboring samples at a corresponding coordinate.

16. The method of claim 1, wherein the conversion comprises encoding the video into the bitstream.

17. The method of claim 1, wherein the conversion comprises decoding the video from the bitstream.

18. An apparatus for processing video data, comprising a processor and a non-transitory memory with instructions thereon, wherein the instructions upon execution by the processor, cause the processor to:

perform a conversion between a video block of a video and a bitstream of the video according to a coding rule, wherein a dimension of the video block is W×H, wherein W is a width of the video block and H is a height of the video block, and wherein the coding rule specifies that whether a coding tool is applied for the video block depends on whether the video block is a non-dyadic block, and wherein the video block is a non-dyadic block when at least one of W and His a non-dyadic number;

wherein a syntax element for indicating a usage of the coding tool is not included in the bitstream when the video block is the non-dyadic block, and wherein the syntax element is inferred to be 0.

19. A method for storing bitstream of a video, comprising:

generating the bitstream of the video based on a video block of the video according to a coding rule, wherein a dimension of the video block is W×H, wherein W is a width of the video block and H is a height of the video block, and wherein the coding rule specifies that whether a coding tool is applied for the video block depends on whether the video block is a non-dyadic block, and wherein the video block is a non-dyadic block when at least one of W and His a non-dyadic number;

wherein a syntax element for indicating a usage of the coding tool is not included in the bitstream when the video block is the non-dyadic block, and wherein the syntax element is inferred to be 0;

storing the bitstream in a non-transitory computer-readable recoding medium.

\* \* \* \* \*